United States Patent
Burnsed, Jr. et al.

(10) Patent No.: US 10,577,197 B1
(45) Date of Patent: Mar. 3, 2020

(54) MAGAZINE FOR LIGHT STICKS

(71) Applicant: Blue Force Gear, Inc., Pooler, GA (US)

(72) Inventors: Ashley A. Burnsed, Jr., Port Wentworth, GA (US); Stephen G. Hilliard, Charleston, SC (US)

(73) Assignee: BLUE FORCE GEAR, INC., Pooler, GA (US)

( * ) Notice: Subject to any disclaimer, the term of this patent is extended or adjusted under 35 U.S.C. 154(b) by 0 days.

(21) Appl. No.: 16/157,532

(22) Filed: Oct. 11, 2018

Related U.S. Application Data

(63) Continuation-in-part of application No. 15/405,542, filed on Jan. 13, 2017, now abandoned.

(60) Provisional application No. 62/571,306, filed on Oct. 12, 2017.

(51) Int. Cl.
*B65G 59/02* (2006.01)

(52) U.S. Cl.
CPC ................................. *B65G 59/02* (2013.01)

(58) Field of Classification Search
CPC ......... B65G 59/02; B65G 59/01; B65G 59/00
USPC ........................................ 221/232, 268, 251
See application file for complete search history.

(56) References Cited

U.S. PATENT DOCUMENTS

| | | | | |
|---|---|---|---|---|
| 909,110 A | * | 1/1909 | O'Neil | B65D 83/10 221/232 |
| 1,701,709 A | * | 2/1929 | Ostrander | G09F 21/22 221/41 |
| 2,141,684 A | * | 12/1938 | Diemer | A47F 1/10 221/239 |
| 2,833,028 A | * | 5/1958 | Treimann | A47F 1/06 221/232 |
| 2,973,882 A | * | 3/1961 | Jeffus | B65D 83/0829 221/228 |
| 3,393,831 A | * | 7/1968 | Stewart | A47F 1/06 221/232 |
| 3,397,818 A | * | 8/1968 | Rey | B65D 83/0829 206/39.4 |
| 4,442,962 A | * | 4/1984 | Musgrave | F42B 39/02 220/230 |
| 4,779,759 A | * | 10/1988 | Seavey | B65D 83/00 221/154 |
| 5,131,562 A | * | 7/1992 | Brown | A47F 1/106 221/193 |

(Continued)

*Primary Examiner* — Rakesh Kumar
(74) *Attorney, Agent, or Firm* — Bennet K. Langlotz; Langlotz Patent & Trademark Works, LLC

(57) ABSTRACT

Magazines for light sticks have an elongated tubular body defining a chamber configured to contain a stack of elongated light sticks, the body defining an exit aperture communicating with the chamber and proximate to a light stick feeding position, a movable actuator proximate the exit aperture and movable between a rest position and an actuated position, the body having a retention element proximate the exit aperture, the actuator having a contact portion spaced apart from the retention element, and the retention element and contact portion being operable to flex a light stick occupying the light stick feeding position in response to movement of the actuator from the rest position to the actuated position. The retention element and contact portion may be operable to eject the light stick occupying the light stick feeding position in response to movement of the actuator from the rest position to the actuated position.

12 Claims, 21 Drawing Sheets

(56) References Cited

U.S. PATENT DOCUMENTS

| | | | | |
|---|---|---|---|---|
| 5,319,872 A * | 6/1994 | Bammate | ............... | F42B 39/00 206/3 |
| 5,328,052 A * | 7/1994 | Kizilos | ................... | A47F 1/085 221/231 |
| 5,547,336 A * | 8/1996 | Whiteman | .......... | B65G 59/062 271/105 |
| 6,378,729 B1 * | 4/2002 | Kodama | ........... | B65G 47/1407 221/196 |
| 6,418,701 B1 * | 7/2002 | Navarro | ............... | B65B 7/2807 221/223 |
| 6,786,357 B2 * | 9/2004 | Renard | ................... | G07F 11/10 221/197 |
| 6,810,616 B2 * | 11/2004 | Tal | ............................ | F41A 9/83 42/87 |
| 7,200,964 B2 * | 4/2007 | Gates | ........................ | F41A 9/67 42/49.01 |
| 7,334,701 B2 * | 2/2008 | Chirnomas | .......... | B65G 47/912 221/104 |
| 7,677,409 B2 * | 3/2010 | Reynolds | ........... | A61B 5/14532 221/232 |
| 8,308,026 B2 * | 11/2012 | Rapko | ...................... | B25B 9/00 206/37 |
| 9,738,433 B2 * | 8/2017 | Hogg | ...................... | B65D 83/02 |
| 2003/0066227 A1 * | 4/2003 | Fitzpatrick | ................ | F41A 9/65 42/50 |
| 2004/0238557 A1 * | 12/2004 | Chirnomas | .............. | A23G 9/28 221/124 |
| 2007/0034640 A1 * | 2/2007 | Casale | ................... | B25C 3/002 221/232 |
| 2010/0072221 A1 * | 3/2010 | Chirnomas | .......... | G07F 11/165 221/211 |
| 2015/0160186 A1 * | 6/2015 | Garner-Richards | ........................ | G01N 33/48757 221/270 |

* cited by examiner

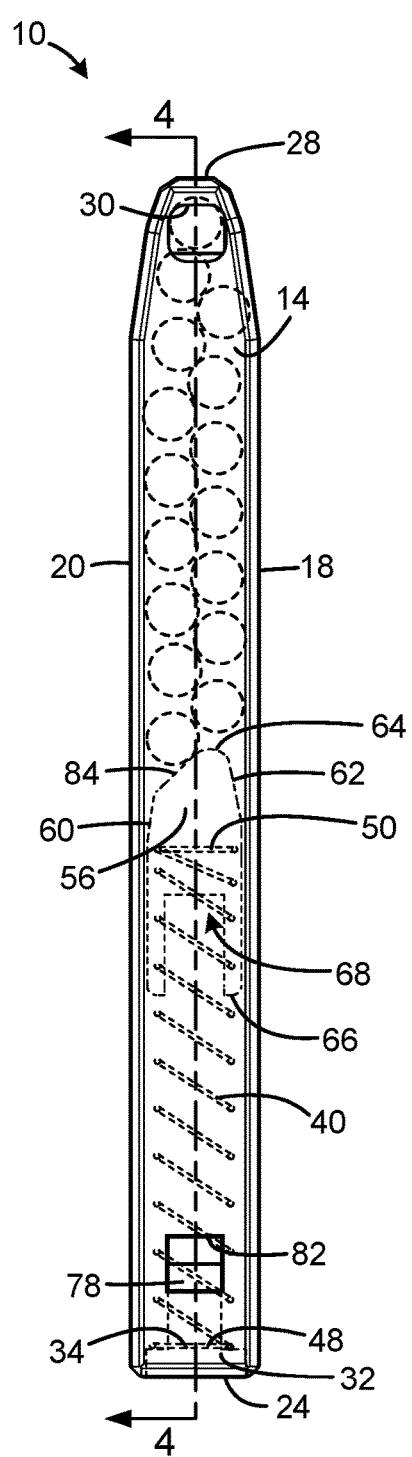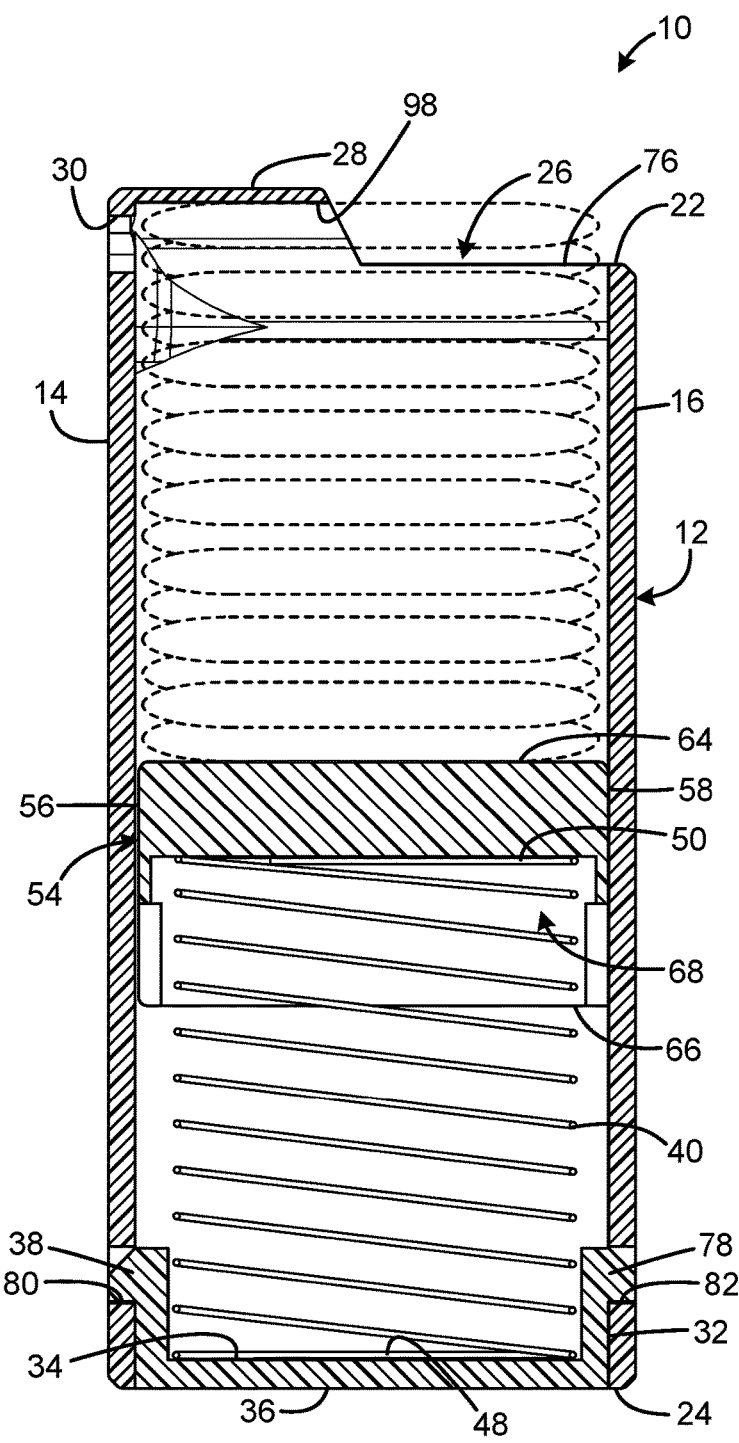
FIG. 3
FIG. 4

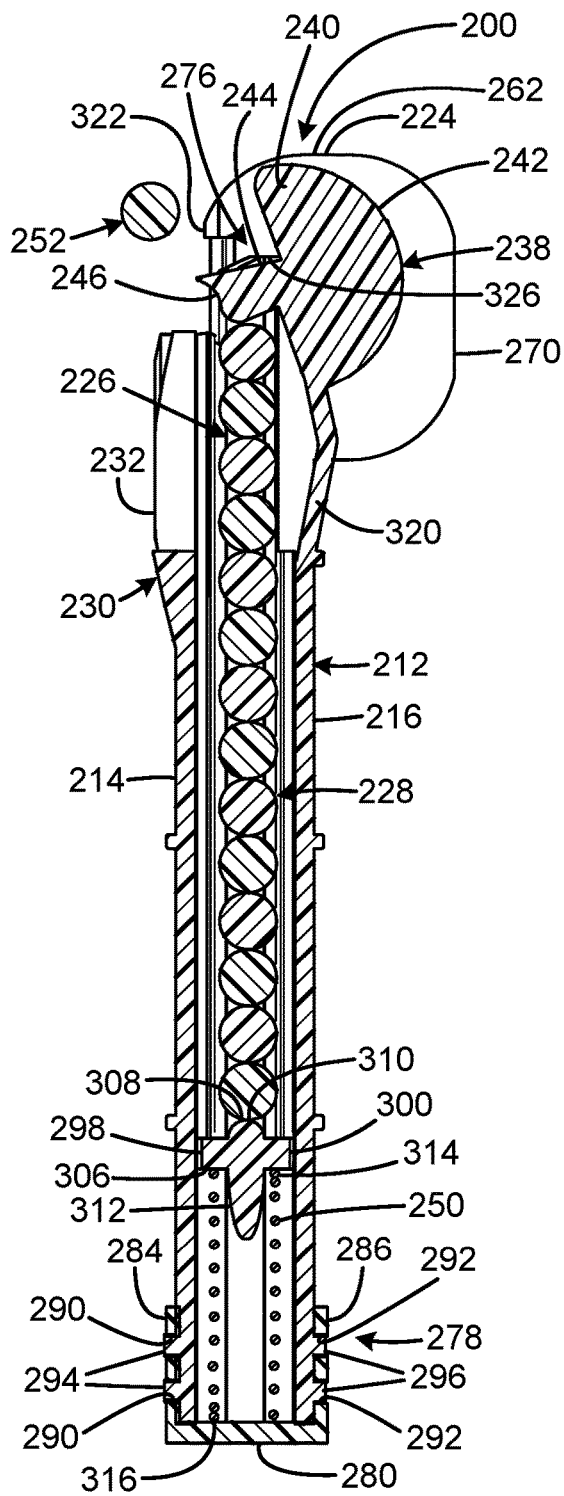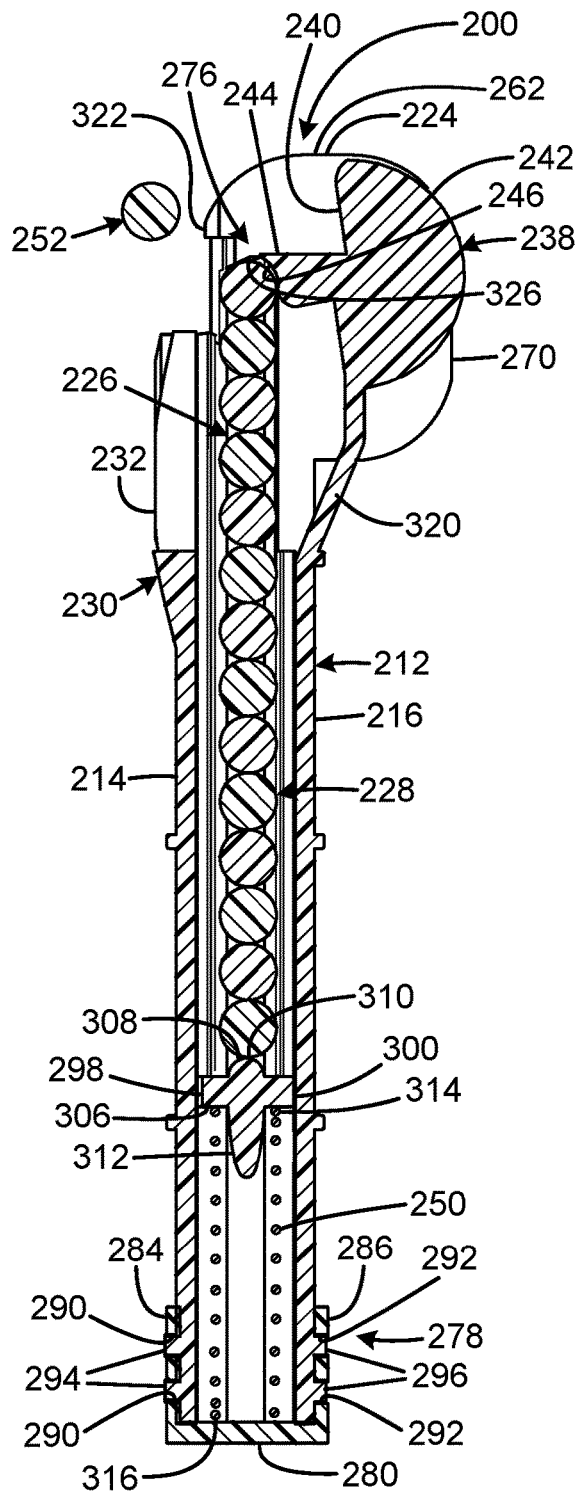

MAGAZINE FOR LIGHT STICKS

CROSS-REFERENCE TO RELATED APPLICATION

This application is a Continuation-in-Part of U.S. patent application Ser. No. 15/405,542 filed on Jan. 13, 2017, entitled "MAGAZINE FOR LIGHT STICKS," and also claims the benefit of U.S. Provisional Patent Application No. 62/571,306 filed on Oct. 12, 2017, entitled "CQB Marker—MARCO," which are hereby incorporated by reference in their entirety for all that is taught and disclosed therein.

FIELD OF THE INVENTION

The present invention relates to magazines, and more particularly to a magazine for light sticks.

BACKGROUND OF THE INVENTION

A magazine is most commonly viewed as an ammunition storage and feeding device attached to a repeating firearm. The magazine functions by moving the cartridges stored in the magazine into a position where they may be chambered by the action of the firearm. Most magazines designed for use with a reciprocating bolt firearm utilize a set of feed lips which stops the vertical motion of the cartridges out of the magazine, but allows one cartridge at a time to be pushed forward (stripped) out of the feed lips by the firearm's bolt into the chamber.

Some form of spring and follower combination is almost always used to feed cartridges to the lips, which are typically located in the magazine. A box magazine, the most popular type of magazine in modern rifles and handguns, stores cartridges in a straight or gently curved column, either one above the other or staggered zigzag fashion. As the firearm cycles, cartridges are moved to the top of the magazine by a follower driven by spring compression to either a single feed position or alternating feed positions. A detachable box magazine is a self-contained mechanism capable of being loaded or unloaded while detached from the host firearm.

Military and law enforcement personnel currently rely on four-inch chemical light sticks to mark doorways and other entrances when engaged in close quarter combat and room clearings. Traditional marking techniques employed by modern warfighters pose many challenges. Conventional solutions for storing and dispensing four-inch chemical light sticks are bulky and difficult to employ and prepare, resulting in wasted man hours and frustration.

Therefore, a need exists for a new and improved magazine for light sticks that houses and enables one-handed dispensing and activating of chemical light sticks. In this regard, the various embodiments of the present invention substantially fulfill at least some of these needs. In this respect, the magazine for light sticks according to the present invention substantially departs from the conventional concepts and designs of the prior art, and in doing so provides an apparatus primarily developed for the purpose of providing a container that enables one-handed dispensing and activation of chemical light sticks.

SUMMARY OF THE INVENTION

The present invention provides an improved magazine for light sticks, and overcomes the above-mentioned disadvantages and drawbacks of the prior art. As such, the general purpose of the present invention, which will be described subsequently in greater detail, is to provide an improved magazine for light sticks that has all the advantages of the prior art mentioned above.

To attain this, the preferred embodiment of the present invention essentially comprises an elongated tubular body defining a chamber configured to contain a stack of elongated light sticks, the body defining an exit aperture communicating with the chamber and proximate to a light stick feeding position, a movable actuator proximate the exit aperture and movable between a rest position and an actuated position, the body having a retention element proximate the exit aperture, the actuator having a contact portion spaced apart from the retention element, and the retention element and contact portion being operable to flex a light stick occupying the light stick feeding position in response to movement of the actuator from the rest position to the actuated position. The retention element and contact portion may be operable to eject the light stick occupying the light stick feeding position in response to movement of the actuator from the rest position to the actuated position. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

FIG. 3 is a front view of the current embodiment of the magazine for light sticks of FIG. 1.

FIG. 4 is a side sectional view of the current embodiment of the magazine for light sticks of FIG. 1.

FIG. 9C is a side sectional view taken along lines 9C-9C of FIG. 7C.

FIG. 9D is a side sectional view taken along lines 9D-9D of FIG. 7D.

The same reference numerals refer to the same parts throughout the various figures.

DESCRIPTION OF THE CURRENT EMBODIMENT

Figure 1:
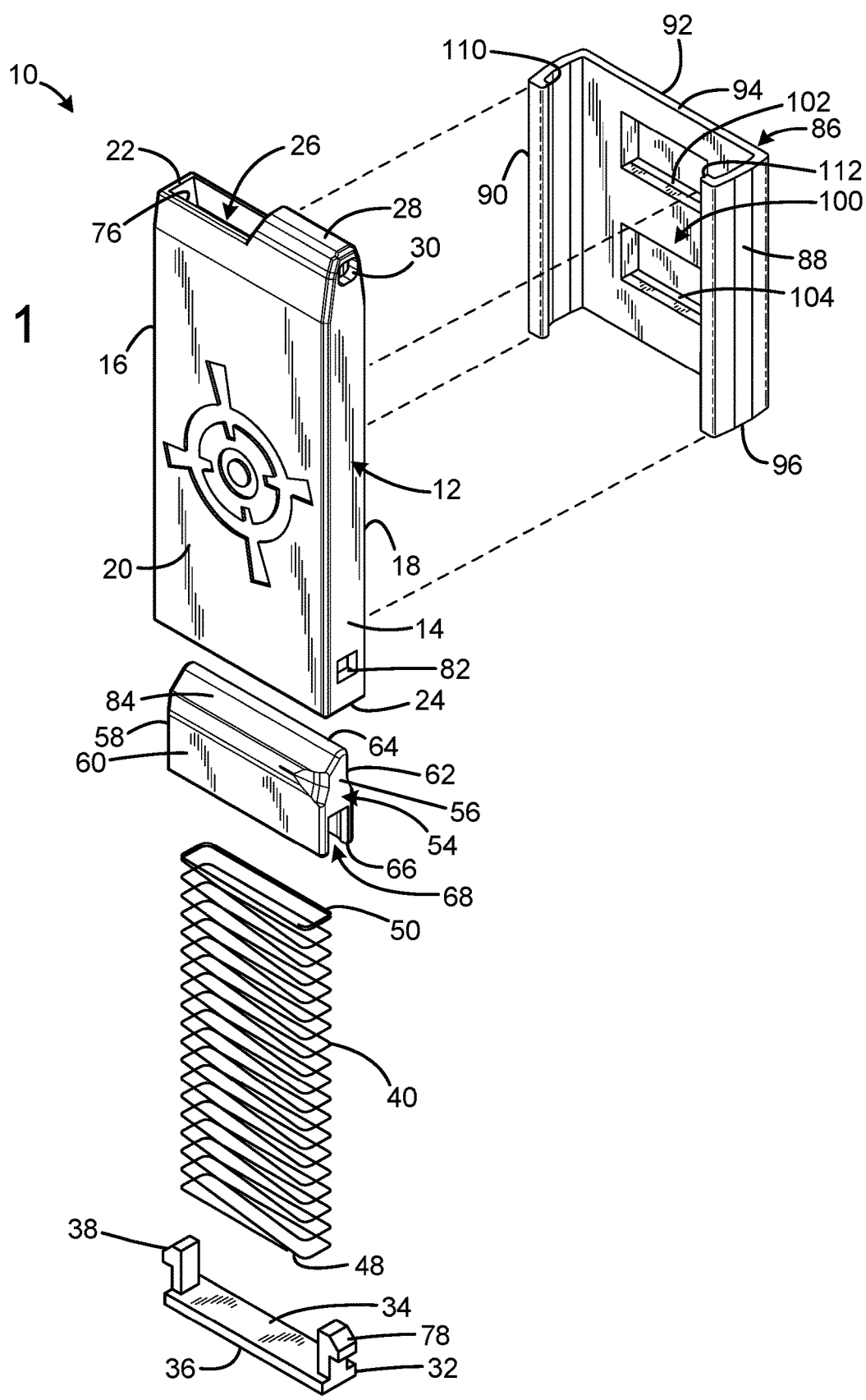
FIG. 1 is an exploded view of the current embodiment of the magazine for light sticks constructed in accordance with the principles of the present invention.
Figure 2:
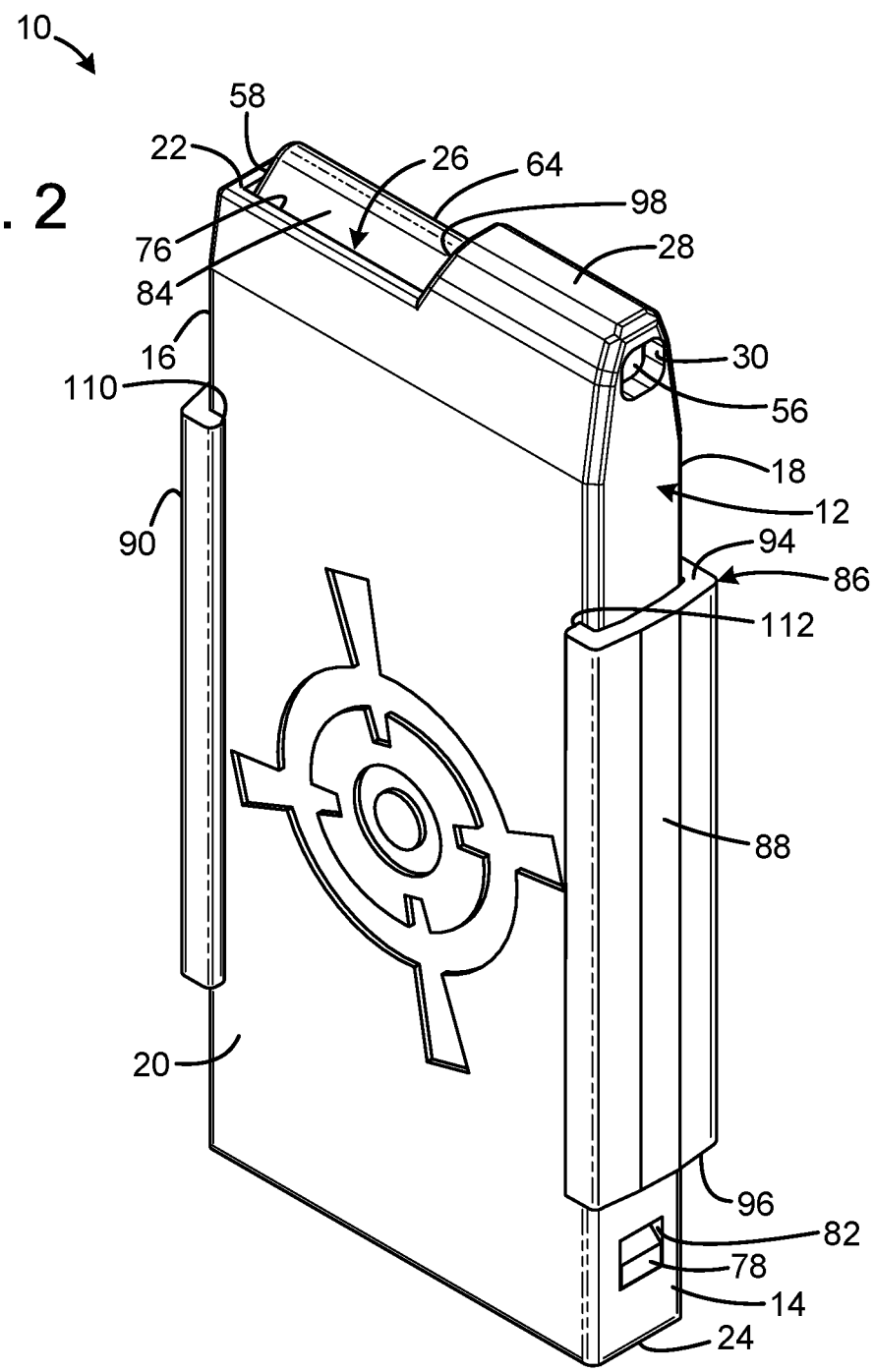
FIG. 2 is a front isometric view of the current embodiment of the magazine for light sticks of FIG. 1.

An embodiment of the magazine for light sticks of the present invention is shown and generally designated by the reference numeral 10.

FIGS. 1-4 illustrate the improved magazine for light sticks 10 of the present invention. More particularly, the magazine body 12 is generally tubular with a central bore 26, and has a front 14, rear 16, left side 18, right side 20, upper end/top 22, and opposed lower end/bottom 24. The front and rear are opposed major side walls, and the front and rear walls are opposed and elongated. The body is hollow and rectangular, thereby defining an interior passage. The passage has a width adapted to receive a staggered double stack of light sticks. The central bore tapers inwards towards the top to feed a single elongated illumination stick/chemical light stick 52 at a time through the top aperture 76 in communication with the central bore. The top aperture is adapted to enable insertion of light sticks into the interior passage. The top front of the body includes a bridge 28 that defines a front aperture/ejection aperture 30, a rear aperture 98, extends from one major side wall to the other, extends less than half the length of the upper end, is proximate the front wall, and comprises bridge walls extending upward from the major sidewalls and toward each other to meet at a ridge. In the current embodiment, the front aperture is square, the rear aperture is a trapezoid, and both apertures are sized to give the ridge an interior width adapted to closely receive and permit the passage of a single two-inch long light stick 52 having a front 72, a rear 74, and a diameter of 0.236 inch in the current embodiment. The rear aperture is a first opening adjacent to the bridge/retention element, and the front aperture/ejection aperture is a second opening spaced apart by the first opening. The first opening has a width defined by the spacing between the major sidewalls, a length based on the distance between the front and rear walls less a length of the bridge/retention element, and extends to the rear wall. The second opening is defined in a panel parallel to the front wall and is proximate the front wall. The second opening has a width of 6.40 mm in the current embodiment. The body has a total height of 134.05 mm, which includes the bridge height of 8.50 mm, a width of 55.82 mm, and a thickness of 16.61 mm. The rear of the bridge is angled such that the top of the bridge is spaced 33.78 mm from the rear of the body, and the bottom of the bridge is spaced 29.48 mm from the rear of the body.

The bottom 24 of the body 12 is open to receive a follower 54 and a rectangular coil spring 40 within the central bore 26. A bottom lid 32 closes the bottom end of the body and secures the follower and spring within the central bore of the body. The bottom lid has a top 34 and a bottom 36. The top includes upwardly protruding latches 38, 78 that releasably secure the bottom lid to the bottom of the body. This is accomplished by the insertion of the latches into apertures 80, 82 in the front 14 and rear 16 of the body. The coil spring biases the follower towards an upper position adjacent to the upper end of the body and is compressed when the magazine body is loaded with light sticks 52. As a result, the follower reciprocates between the upper position and a lower position more proximate the lower end of the body. The bridge 28 serves as a retention element adapted to retain chemical light sticks within the interior passage against the biasing force of the spring.

The follower 54 has a front 56, rear 58, left side 60, right side 62, top 64, and bottom 66. The top of the follower has a smooth, angled platform portion 84 extending the length of the follower. The bottom of the follower defines a channel 68 that bifurcates the underside of the follower and receives the top end 50 of the coil spring 40.

An optional receiver 86 provides an alternative means for attaching the magazine for light sticks 10 to the user. The receiver has a front 88, rear 90, left 92, top 94, and bottom 96. The left side is open except for small protrusions 110, 112 extending from the front and rear of the receiver to define a channel 100 between the front, right, and rear. Upper and lower slots 102, 104 enable to user to mount the receiver parallel or perpendicular to the user's waistline when using changeable Modular Lightweight Load-carrying Equipment (MOLLE)-compatible securing straps. The front and rear of the receiver, including the small protrusions act as pressure fits around the rectangular body 12 to releasably secure the magazine for light sticks 10 within the channel 100.

Figure 5:
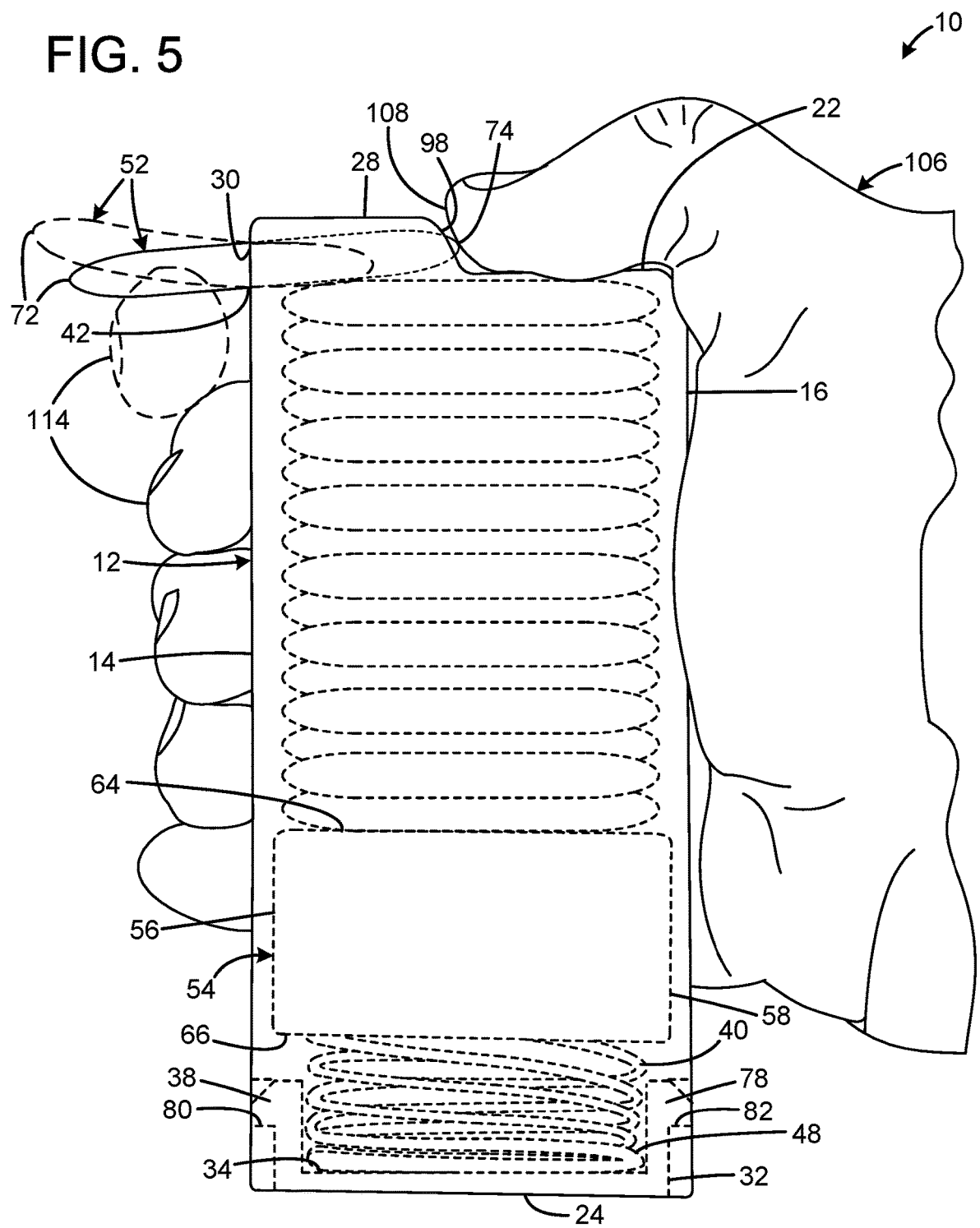
FIG. 5 is a left side view of the current embodiment of the magazine for light sticks of FIG. 1 showing the process for dispensing and activating a light stick.

FIG. 5 depicts the procedure for dispensing and activating a light stick 52 from the magazine for light sticks 10. Usage of the magazine for light sticks 10 for storing and dispensing light sticks is particularly advantageous because the user can dispense and activate a light stick using only one hand 106. To dispense a light stick, the user first pushes the rear 74 of the uppermost light stick exposed by the top aperture 76 of the body 12 with a thumb 108 to force the front 72 of the light stick that is received under the bridge 28 through the rear aperture 98 and out the front aperture 30. To provide the thumb with leverage, the user grasps the front 14 of the body with a forefinger 114. An intermediate portion of the chemical light stick 42 is closely received by the front aperture/ejection aperture, such that a portion of the light stick protrudes from the body and a portion of the light stick is retained by the body to enable the light stick to be flexed for activation. Once a sufficient portion of the front of the light stick protrudes from the front aperture (about ½" as denoted by the broken lines), the user grasps the rear 16 of the body with the thumb, places the forefinger below the front protruding portion of the light stick, and then flexes the light stick upwards until the light stick fractures internally to mix the chemicals stored within and activate the illumination-generating reaction. Finally, the user pinches the protruding front portion of the light stick between the thumb and forefinger and withdraws the rear of the light stick from under the bridge through the front aperture to dispense the activated light stick. The follower 54 then urges the stack of light sticks upwards until the newly uppermost light stick has its front retained by the bridge, ready to be dispensed by repeating the dispensing and activating procedure.

Figure 6A:
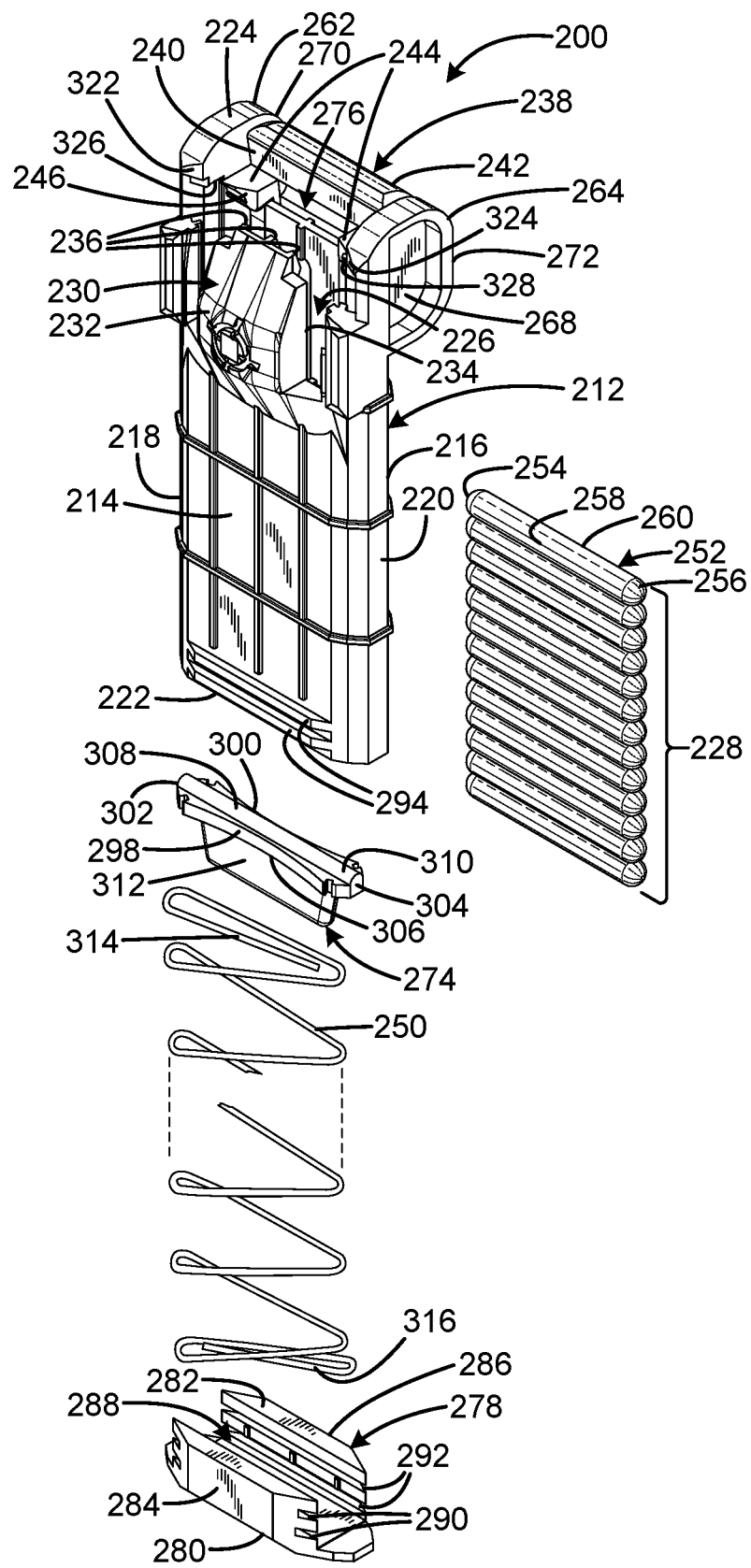
FIG. 6A is a front exploded view of a first alternative embodiment of the magazine for light sticks constructed in accordance with the principles of the present invention.
Figure 6B:
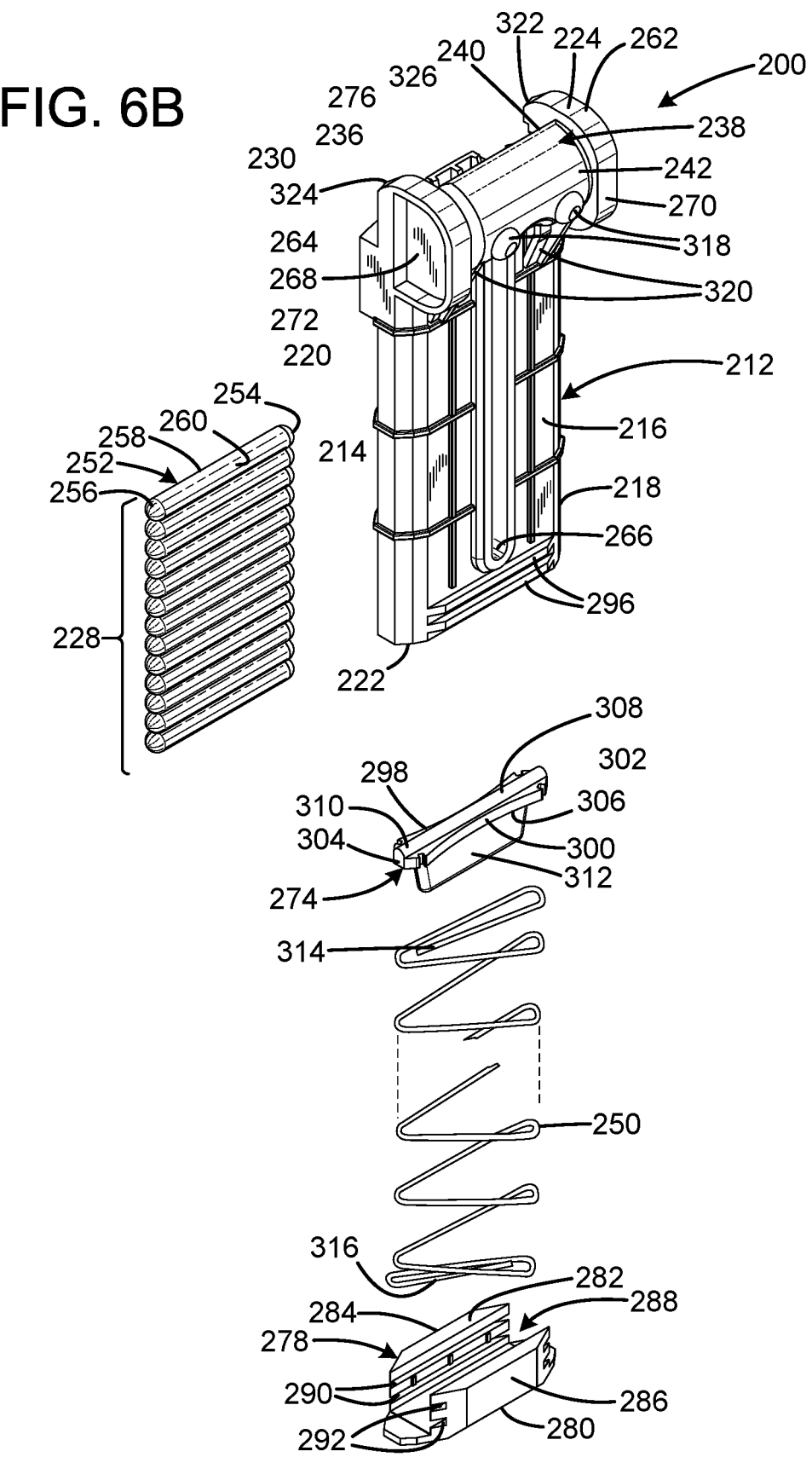
FIG. 6B is a rear exploded view of the alternative embodiment of the magazine for light sticks of FIG. 6A.
Figure 7A:
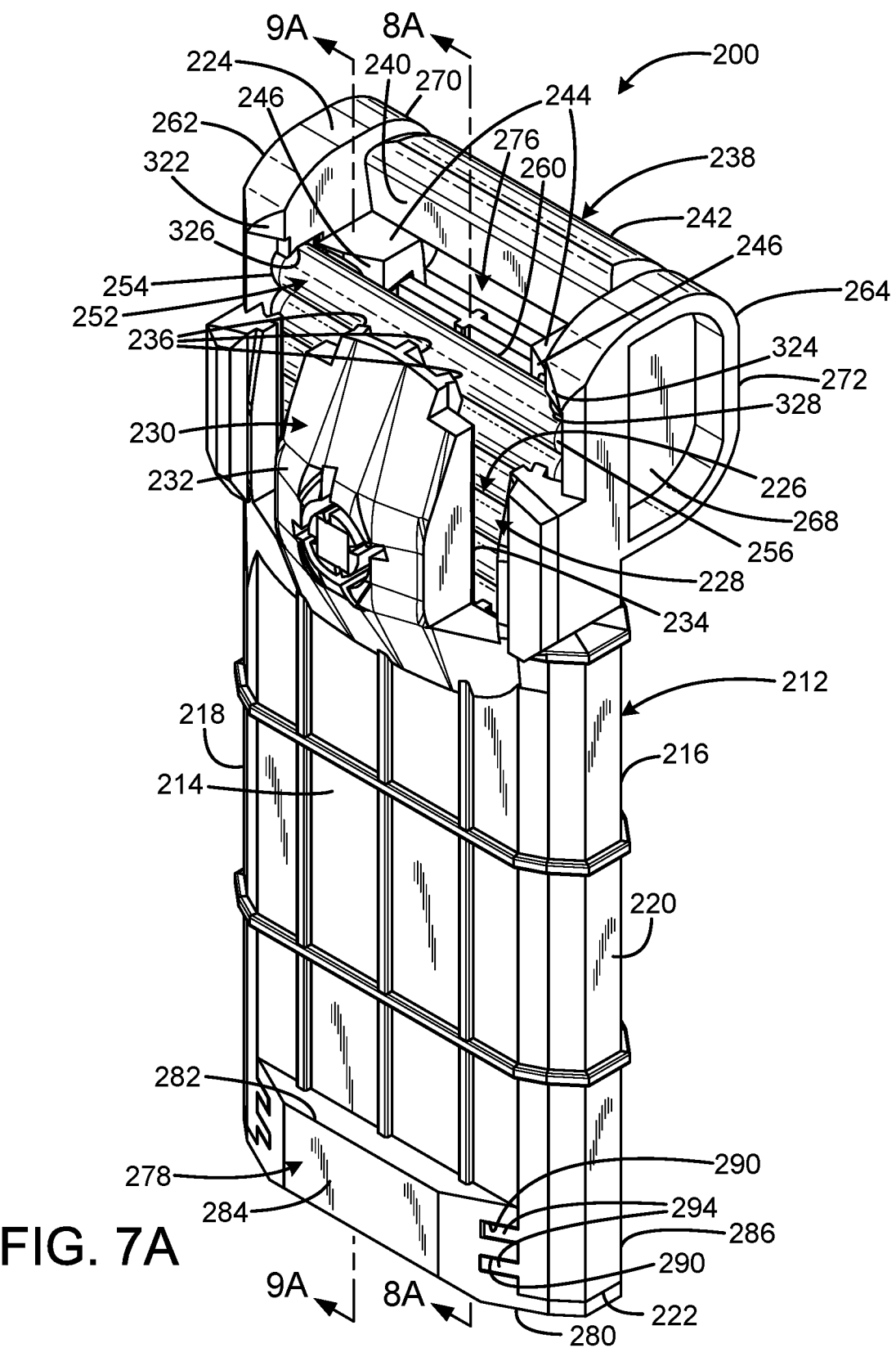
FIG. 7A is a front isometric view of the first alternative embodiment of the magazine for light sticks of FIG. 6A in the ready to dispense a light stick condition.
Figure 7B:
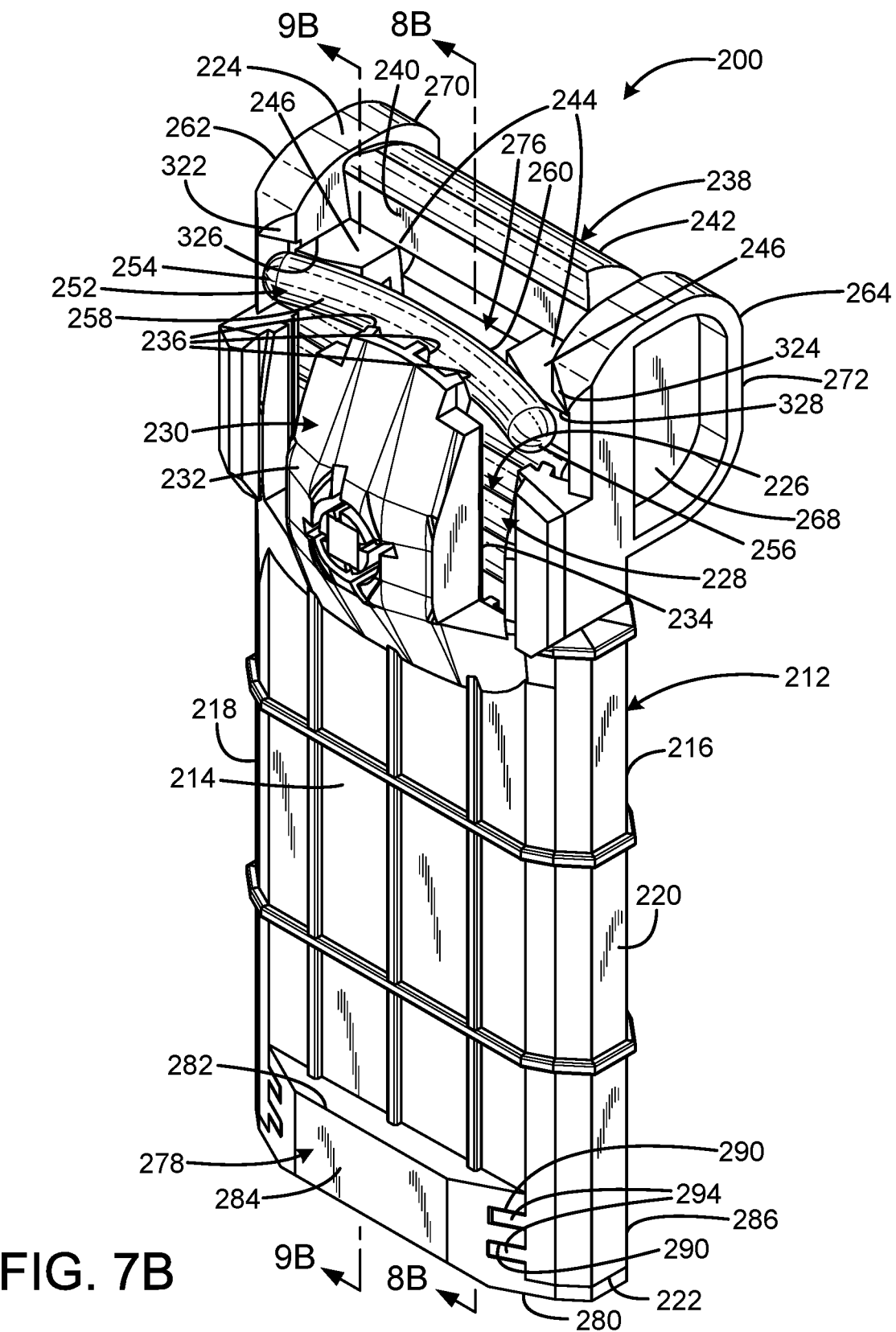
FIG. 7B is a front isometric view of the first alternative embodiment of the magazine for light sticks of FIG. 6A in the process of dispensing a light stick.
Figure 7C:
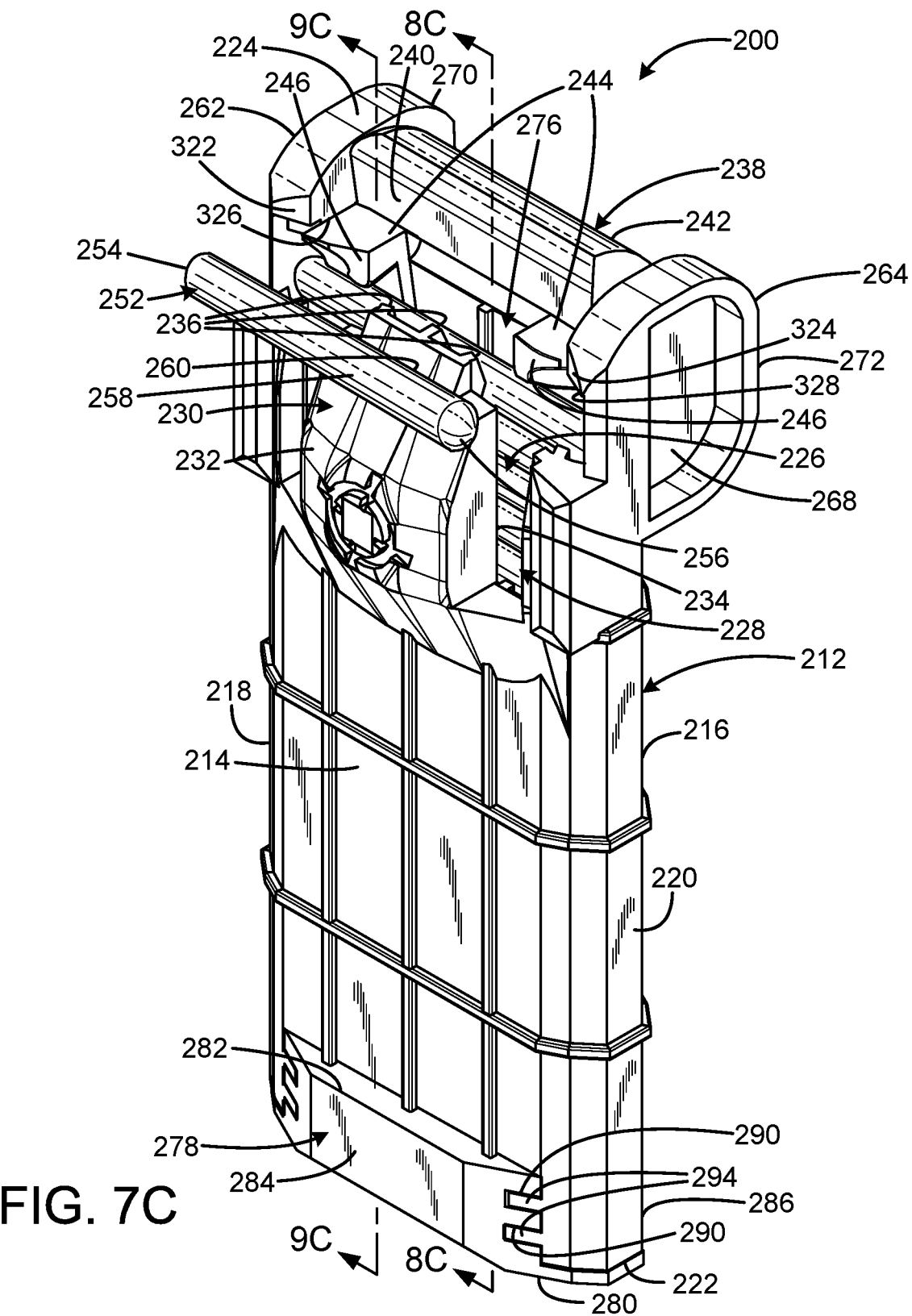
FIG. 7C is a front isometric view of the first alternative embodiment of the magazine for light sticks of FIG. 6A immediately after dispensing a light stick.
Figure 7D:
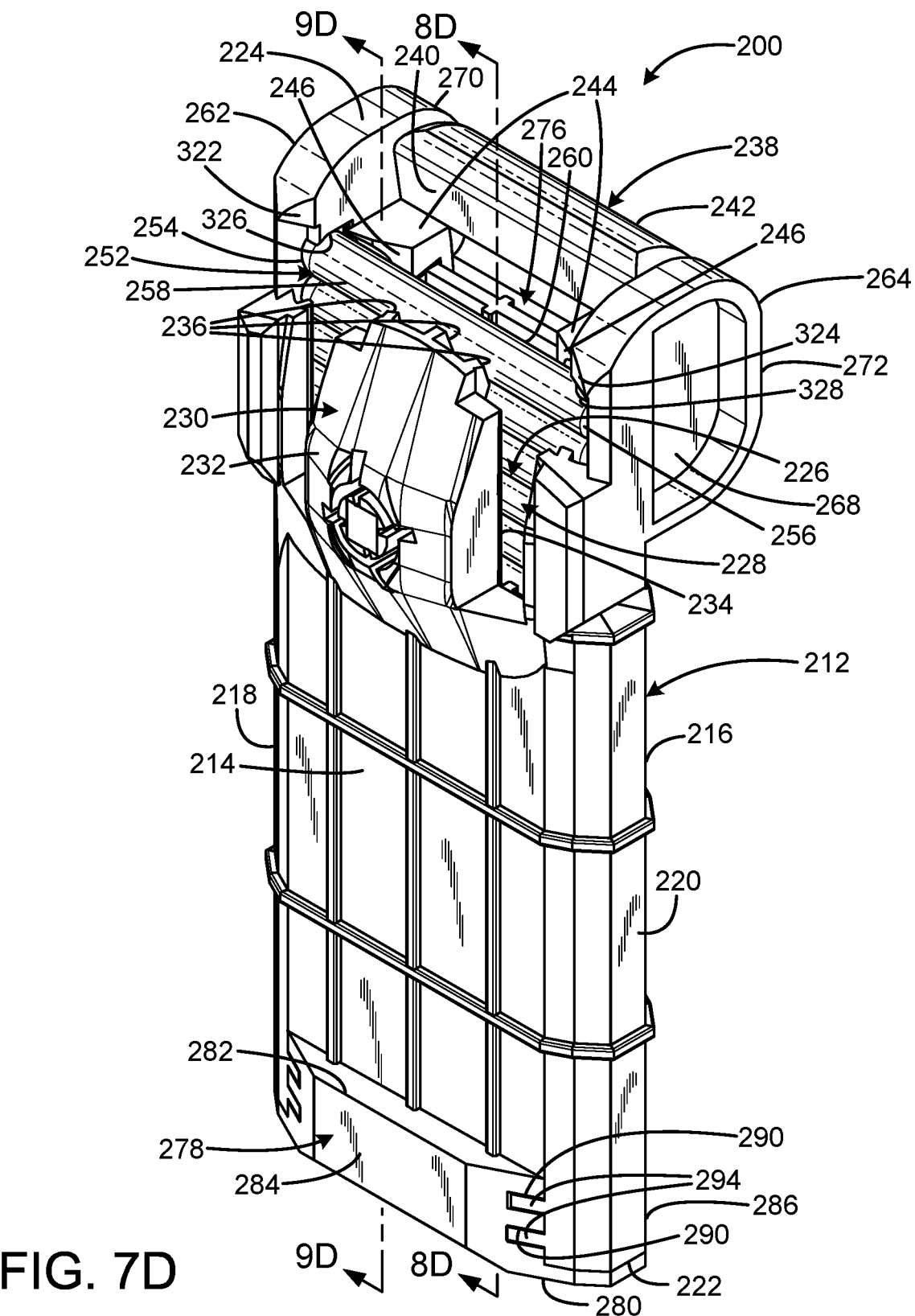
FIG. 7D is a front isometric view of the first alternative embodiment of the magazine for light sticks of FIG. 6A having returned to the ready to dispense a light stick condition after dispensing a light stick.
Figure 8A:
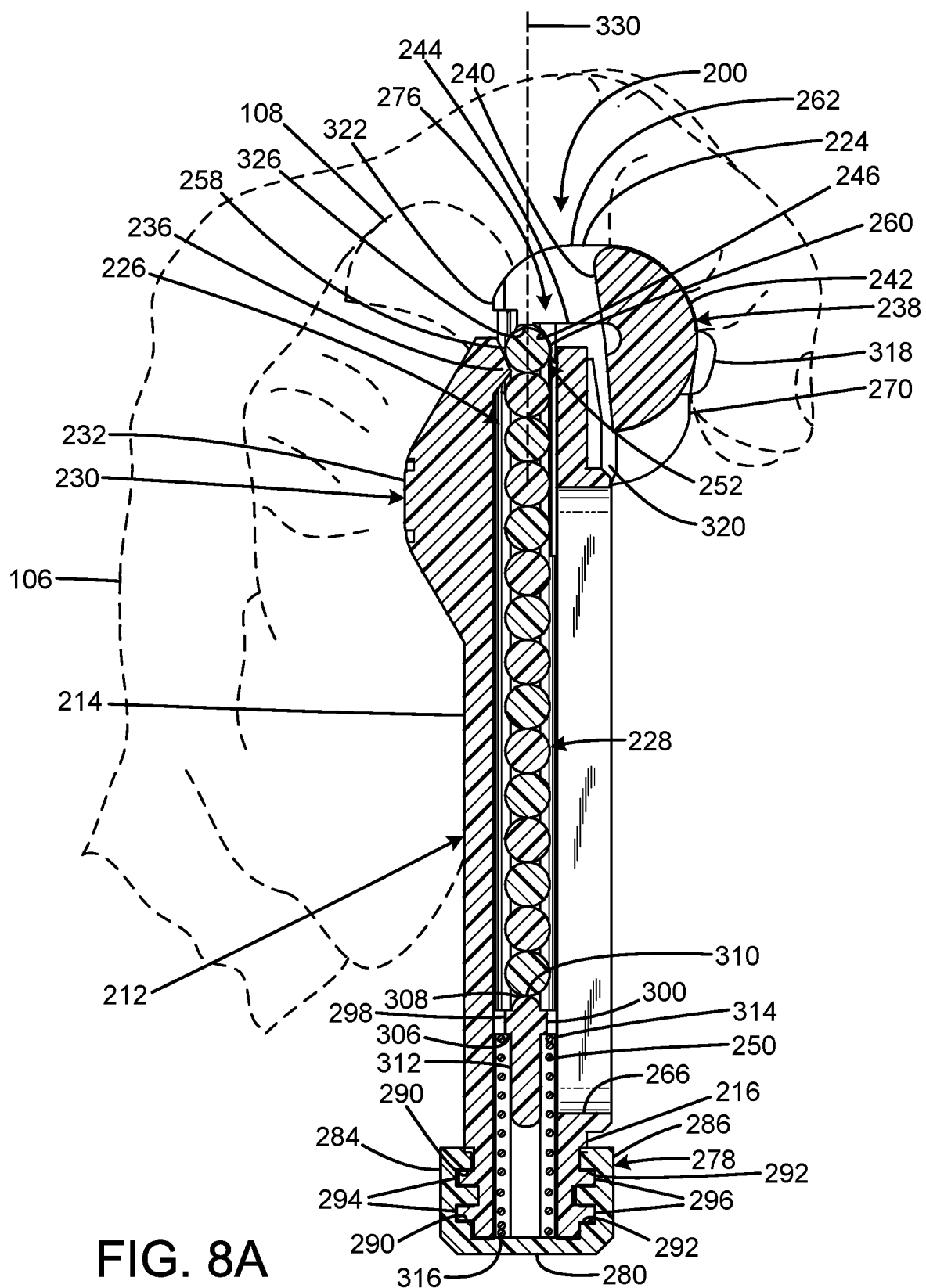
FIG. 8A is a side sectional view taken along lines 8A-8A of FIG. 7A.
Figure 8B:
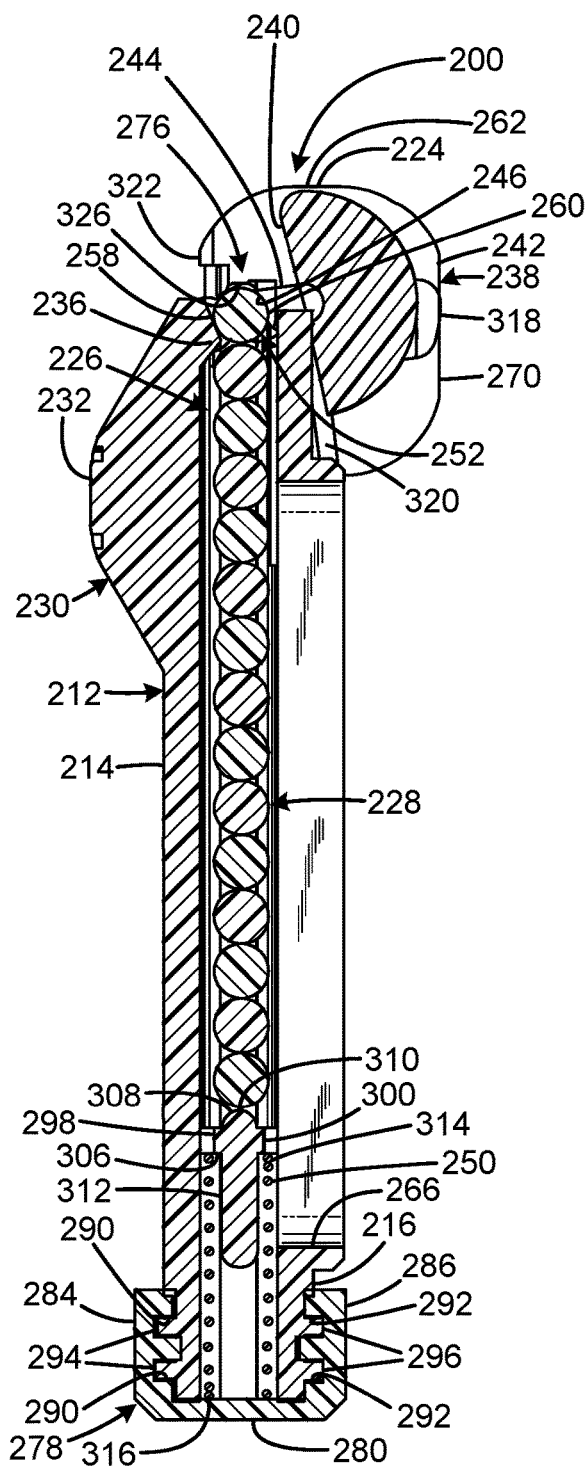
FIG. 8B is a side sectional view taken along lines 8B-8B of FIG. 7B.
Figure 8C:
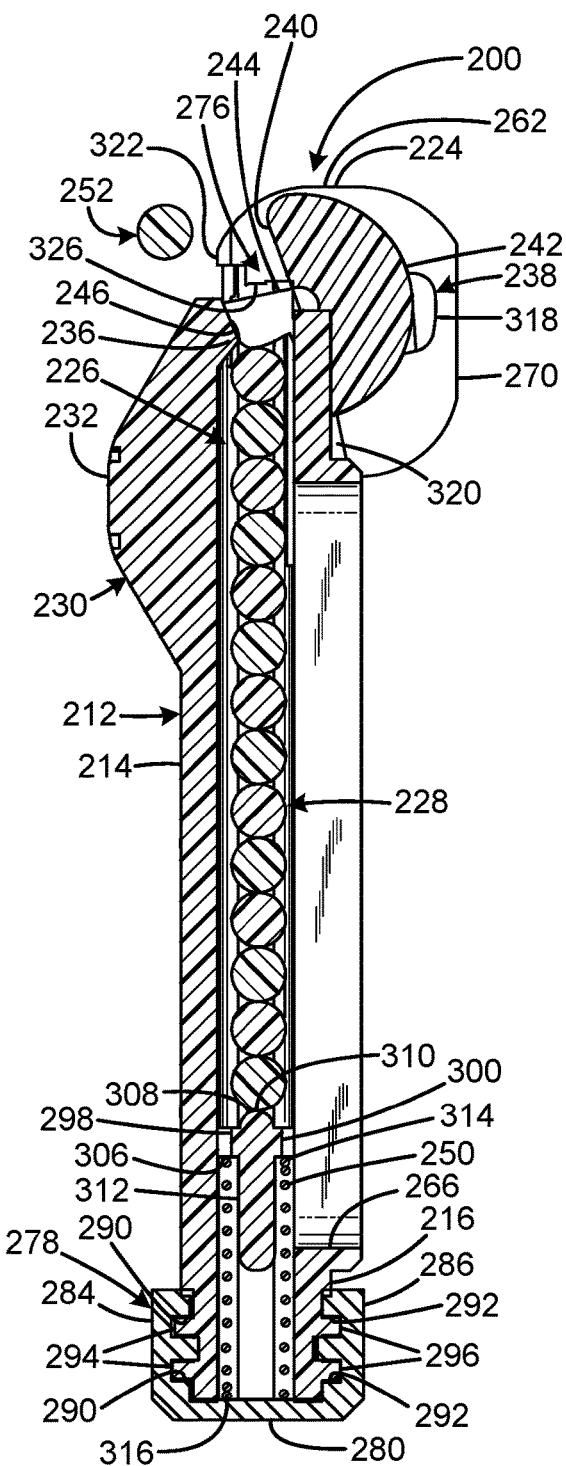
FIG. 8C is a side sectional view taken along lines 8C-8C of FIG. 7C.
Figure 8D:
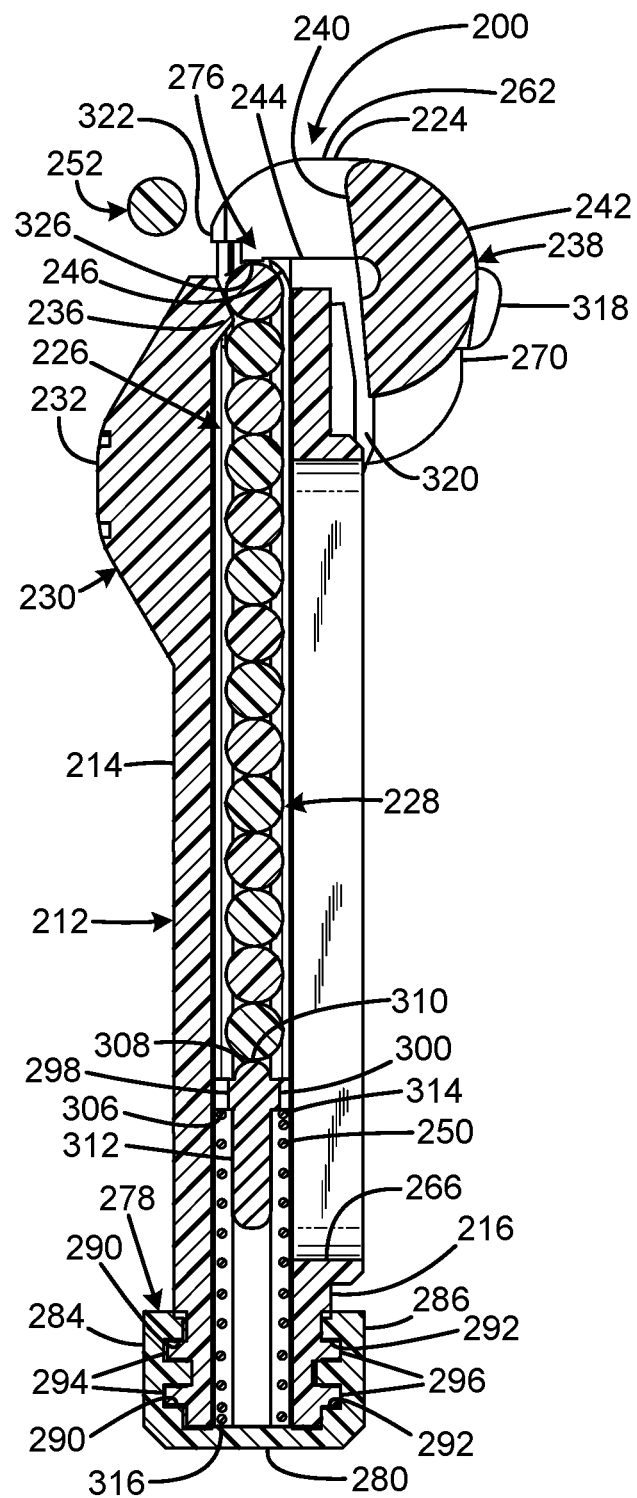
FIG. 8D is a side sectional view taken along lines 8D-8D of FIG. 7D.
Figure 9A:
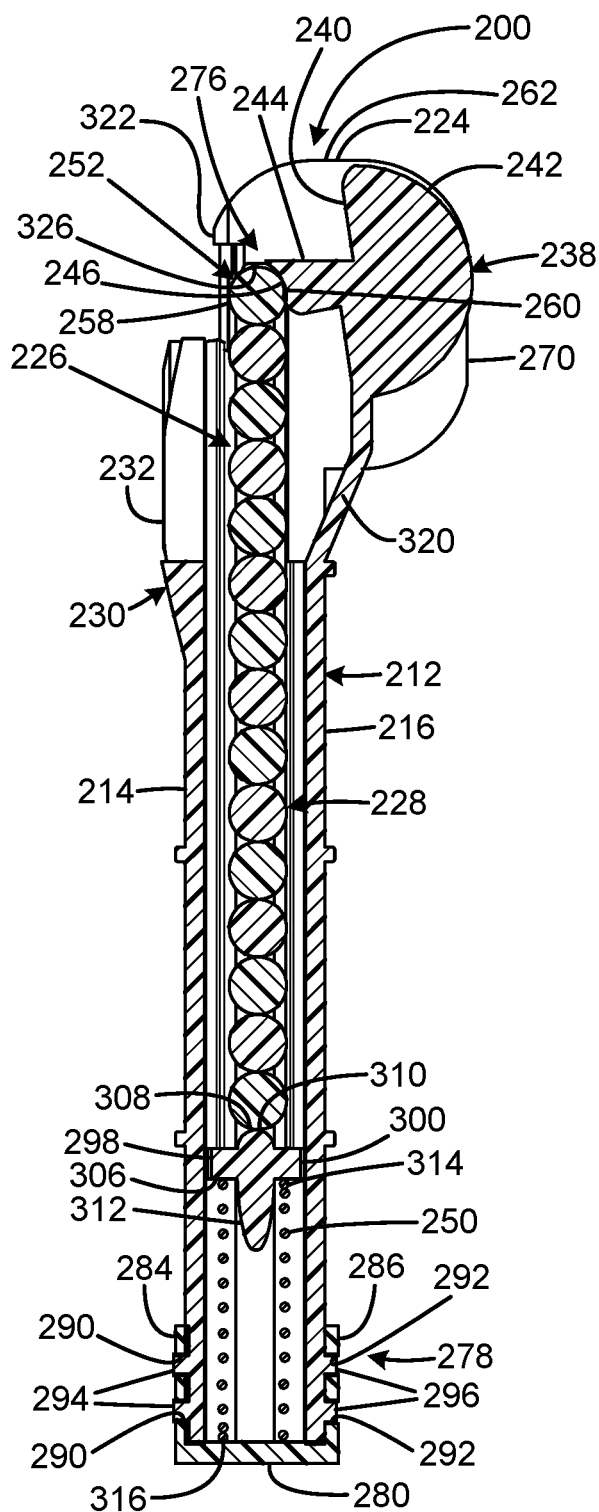
FIG. 9A is a side sectional view taken along lines 9A-9A of FIG. 7A.
Figure 9B:
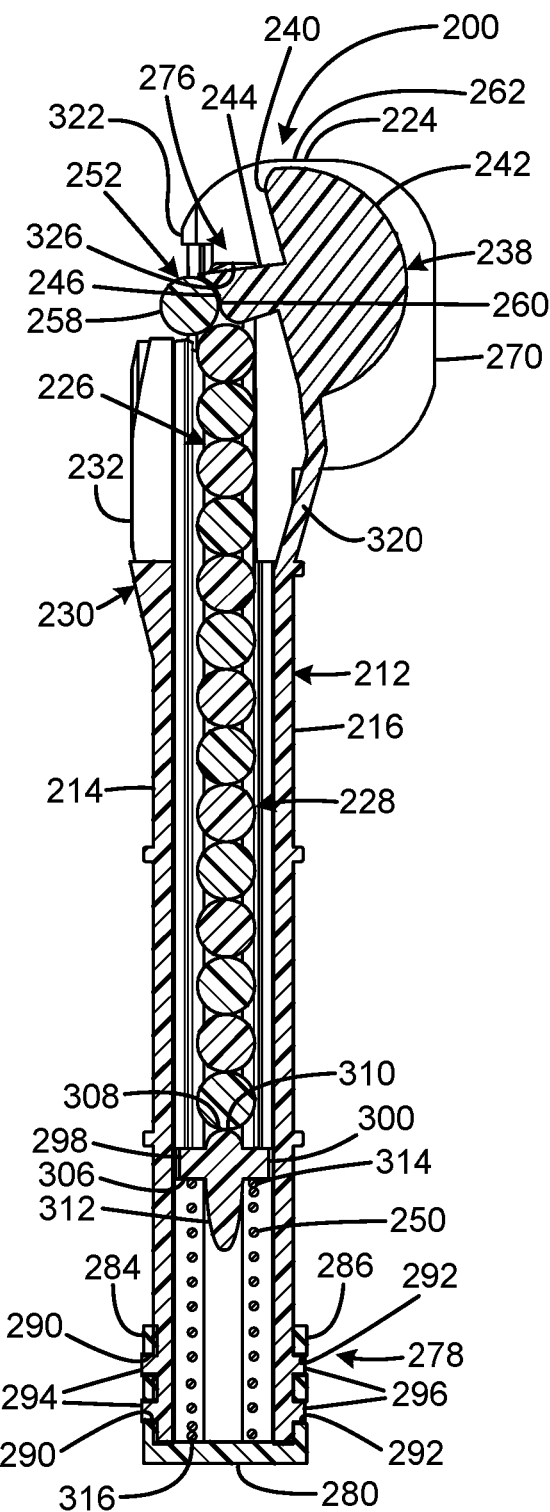
FIG. 9B is a side sectional view taken along lines 9B-9B of FIG. 7B.
Figure 10:
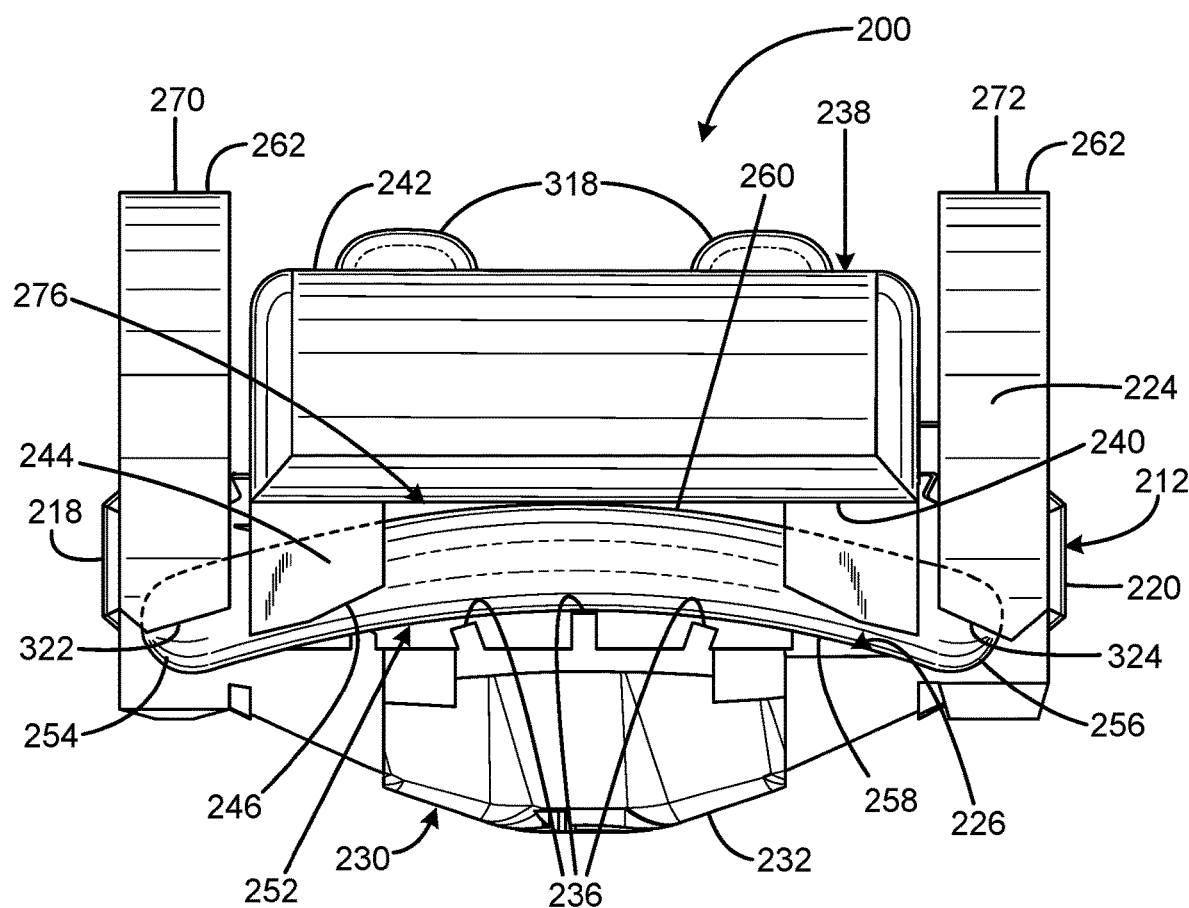
FIG. 10 is a bottom view of the first alternative embodiment of the magazine for light sticks of FIG. 6A in the process of dispensing a light stick.
Figure 11:
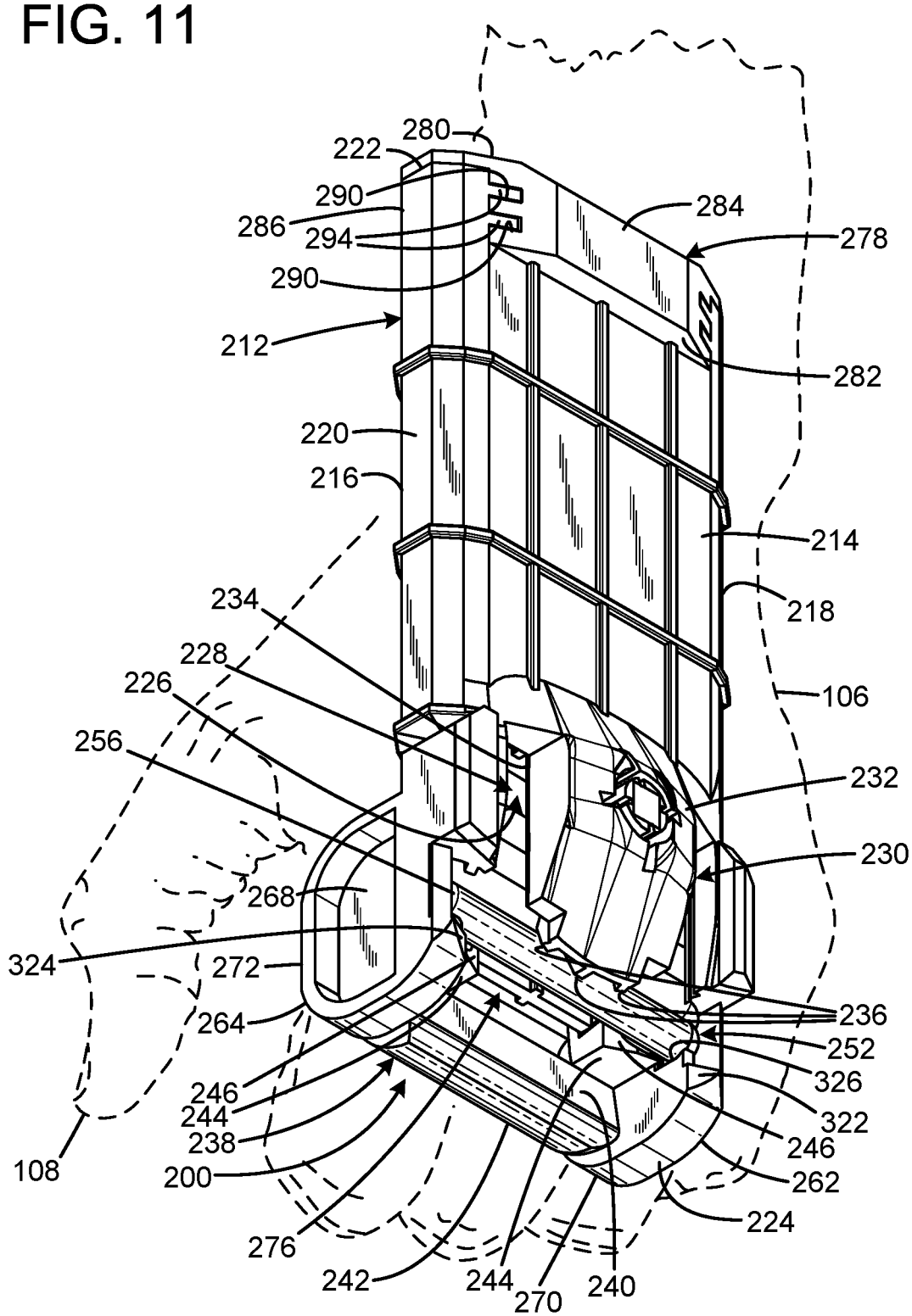
FIG. 11 is a front isometric view of the first alternative embodiment of the magazine for light sticks of FIG. 6A shown in use by a user to dispense a light stick.

FIGS. 6A-B illustrate a first alternative embodiment of the improved magazine for light sticks 200 of the present invention. More particularly, the magazine body 212 is elongated and generally tubular with a central bore 226, and has a front 214, rear 216, left side 218, right side 220, upper end/top 222, and opposed lower end/bottom 224. The front and rear are opposed parallel major faces, and the front and rear walls are opposed and elongated. The body is hollow and rectangular, thereby defining an interior passage. The interior passage is a chamber having a width configured to contain a stack 228 of elongated light sticks 252. In the current embodiment, the stack of elongated light sticks is a single stack. The central bore feeds a single elongated illumination stick/chemical light stick at a time through the top aperture 276 in communication with the central bore. The top aperture is (exit aperture) communicates with the chamber and proximate to a light stick feeding position. The top aperture is adapted to enable insertion of light sticks into the interior passage. In the current embodiment, the top aperture permits the passage of a single two-inch long light stick having a left end 254, opposed right end 256, front surface 258, rear surface 260, and a diameter of 0.236 inch in the current embodiment. The bottom front of the body includes an anvil 230 having a front 232 and rear 234. The front of the anvil is a convex palm swell adapted to be cupped by the hand 106 of a user. The rear of the anvil includes three vertical ribs 236 (retention element) proximate the exit aperture that extend rearward in communication with the top aperture. The bottom rear of the body includes a movable actuator 238 having a front 240 and rear 242 that is proximate the exit aperture and movable between a rest position and an actuated position. The actuator is attached to the body by screws 318 that connect the actuator to spring arms 320 that extend downwards from the rear of the body. In the current embodiment, the spring arms bias the actuator rearwardly away from the rear of the anvil. The rear of the actuator is convex to facilitate gripping of the actuator by a user's fingers so the user can squeeze the actuator towards the anvil. Thus, the actuator is movable in a direction perpendicular to a length of the body and in a direction perpendicular to the opposed parallel major faces. The front of the actuator includes two arms 244, each having a front surface 246 (contact portion) spaced apart from the retention element. The bottom left and right sides of the body include a left ear 262 and a right ear 264. The left and right ears each define a thumb recess (the right ear's thumb recess 268 is visible. The left and right ears have convex rears 270, 272 to facilitate gripping of the ears by a user's fingers. The left and right ears have fronts 322, 324, each defining an upwardly facing feed lip 326, 328.

The top 222 of the body 212 is open to receive a follower 274 and a rectangular coil spring 250 within the central bore 226. A top lid 278 closes the top end of the body and secures the follower and spring within the central bore of the body. The top lid has a top 280 and a bottom 282. The bottom includes downwardly protruding front and rear sides 284, 286 that define a central channel 288. The front side defines a pair of slots 290, and the rear side defines a pair of slots 292. The pairs of slots communicate with the central channel. To releasably secure the top lid to the top of the body, the top of the body is slid sideways into the central channel such that ridges 294 defined on the top front of the body are slidably received within slots 290, and ridges 296 defined on the top rear of the body are slidably received within slots 292. The coil spring biases the follower towards a lower position adjacent to the bottom end of the body and is compressed when the magazine body is loaded with a stack 228 of light sticks 252. As a result, the follower reciprocates between the bottom position and an upper position more proximate the top end of the body. The upwardly facing feed lips 326, 328 on the left and right ears 262, 264 serve as retention elements adapted to retain the left and right ends 254, 256 of the lowermost light stick 252 of a stack 228 of light sticks within the interior passage against the downward biasing force of the spring. Thus, the feed lips are retaining elements configured to resist removal of the light stick occupying the light stick feeding position except in response to movement of the actuator to compress the spring. The retaining elements are a protrusion extending toward an opposite end of the chamber away from the exit aperture. The rear 216 of the body defines an elongated central slot 266 that communicates with the central bore.

The follower 274 has a front 298, rear 300, left side 302, right side 304, top 306, and bottom 308. The bottom of the follower has a convex rounded platform portion 310 extending the length of the follower. The top of the follower defines an upwardly protruding spring support 312 that is received by the bottom end 314 of the coil spring 250. The coil spring also has an opposed top end 316 that contacts the underside of the top 280 of the top lid 278 when the magazine for light sticks 200 is assembled. When the follower is received within the central bore 226 of the body 212, the follower is accessible by a finger inserted through the central slot 266. Thus, a user can engage the follower to overcome the coil spring and pull the follower to the top 222 of the body to load a stack 228 of light sticks 252 through the top aperture 276 into the central bore of the body. The elongated central slot can also be used to visually assess the quantity of light sticks remaining in the body. The body defines a vertical feed axis 330, and the spring coil spring is adapted to urge the stack of light sticks toward the exit aperture.

FIGS. 7A-11 depict the procedure for dispensing and activating a light stick 252 from the magazine for light sticks 200. Usage of the magazine for light sticks 200 for storing and dispensing light sticks is particularly advantageous because the user can dispense and activate a light stick using only one hand 106. To dispense a light stick from the ready to dispense position of the magazine for light sticks 200 shown in FIGS. 7A, 8A & 9A, the user first grips the bottom 224 of the magazine body 212 by cupping the front 232 of the anvil 230 with his or her hand 106, engaging his or her thumb 108 in either thumb recess depending on whether the user's right or left handed, and gripping the rear 242 of the actuator 238 with his or her fingers (shown in FIG. 11). The user than squeezes the actuator forward towards the rear 234 of the anvil. As the actuator moves forward, the front surfaces 246 of the arms 244 contact the rears 260 of the left and right ends 254, 256 of the lowermost light stick 252 and push the light stick towards the rear of the anvil. As the actuator moves forward, the front 258 of the light stick contacts the ribs 236 of the anvil, which causes the left and right ends of the light stick to flex forward (shown in FIGS. 7B, 8B, 9B & 10). Thus, the retention element and contact portion are operable to flex a light stick occupying the light stick feeding position in response to movement of the actuator from the rest position to the actuated position. Pressure exerted by the ribs on the front of the light stick eventually causes a glass vial (not shown) contained within the light stick to fracture in multiple locations. Thus, one of the retention element and the contact portion is configured to contact the light stick occupying the light stick feeding position at an end portion of the light stick, and the other of the retention element and contact portion is configured to contact the light stick occupying the light stick feeding position at an intermediate portion of the light stick. Furthermore, one of the retention element and the contact portion is configured to contact the light stick occupying the light stick feeding position at opposed end portions of the light stick, and the other of the retention element and contact portion is configured to contact the light stick occupying the light stick feeding position at an intermediate portion of the light stick. In addition, the contact portion includes a plurality of contact points along the length of the light sticks and is operable to flex the light stick at each of the contact points. The fracturing of the glass vial enables a first chemical (not shown) contained within the glass vial to mix with a second chemical (not shown) contained within the light stick outside of the glass vial. The first and second chemicals chemically react to form a third chemical (not shown). The chemical reaction produces visible light. The fracturing of the glass vial in multiple locations enables the first and second chemicals to mix more rapidly than they could if the glass vial were fractured in only one location. As a result, a vigorous chemical reaction is quickly induced, and the light stick rapidly produces visible light without a delay that could occur if the glass vial were fractured in only one location.

As the left and right ends 254, 256 of the lowermost light stick 252 flex forward, the left and right ends of the lowermost light stick escape out from under the upwardly facing feed lips 326, 328. Once the user releases the actuator 238, the spring arms 320 urge the actuator rearwards to return the magazine for light sticks 200 to the ready to dispense position. Once the actuator's arms are no longer squeezing the light stick against the ribs 236 of the anvil 230, the light stick is free to fall downward through the top aperture 276 into the user's hand 106 (shown in FIGS. 7C, 8C & 9C). Thus, retention element and contact portion are operable to eject the light stick occupying the light stick feeding position in response to movement of the actuator from the rest position to the actuated position. Furthermore, the actuator is configured to initially flex a light stick in a flexed condition and to retain the light stick while the actuator is in the actuated position, and to release the light stick from the magazine when subsequently returned to the rest position. Simultaneously, the follower 274 is urged downward by the coil spring 250 to lower the stack 228 of light sticks so a new lowermost light stick is ready to be dispensed. At this point, the magazine for light sticks 200 is returned to the ready to dispense position shown in FIGS. 7D, 8D & 9D).

Figure 12:
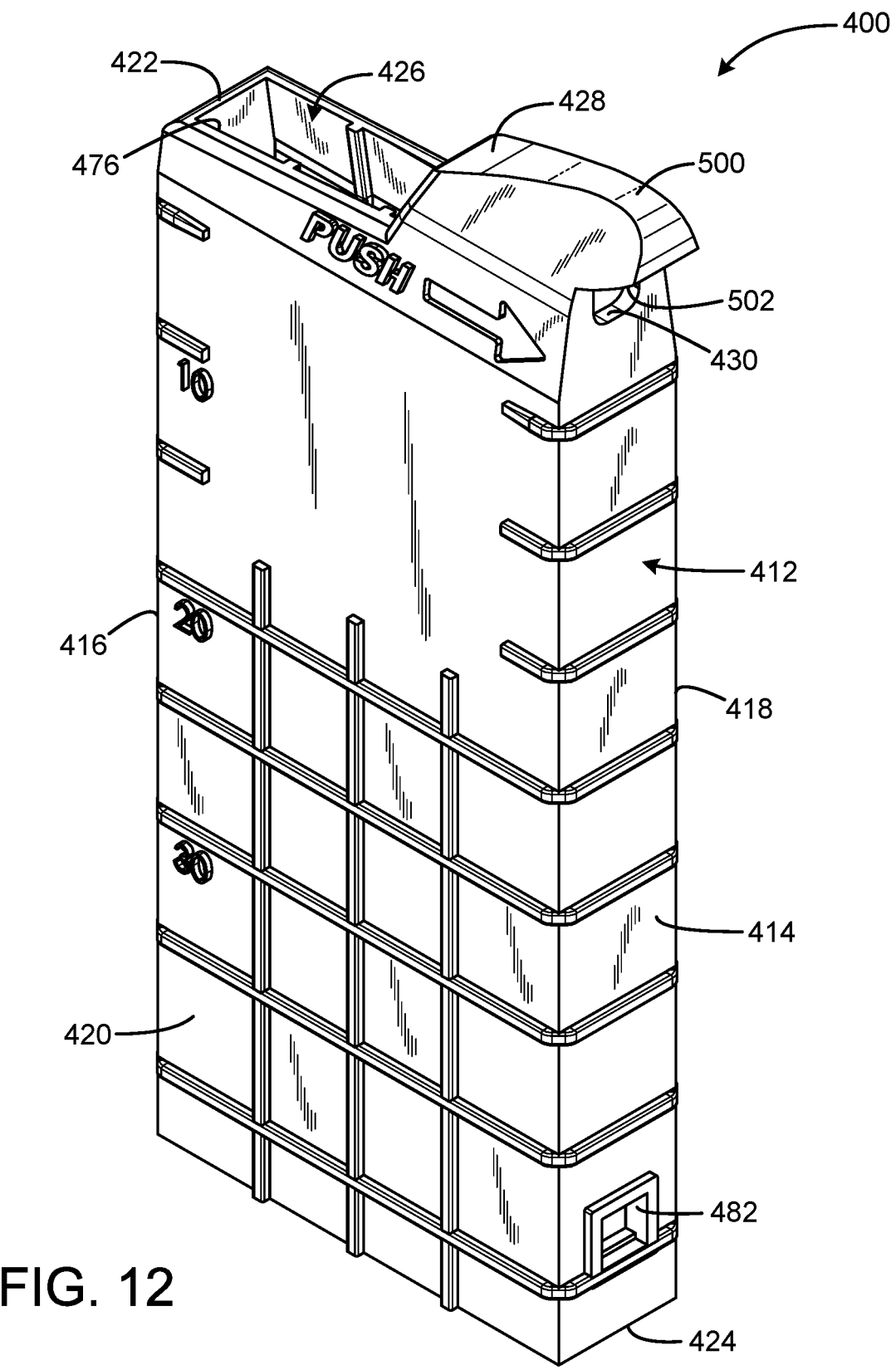
FIG. 12 is a front isometric view of a second alternative embodiment of the magazine for light sticks constructed in accordance with the principles of the present invention.
Figure 13A:
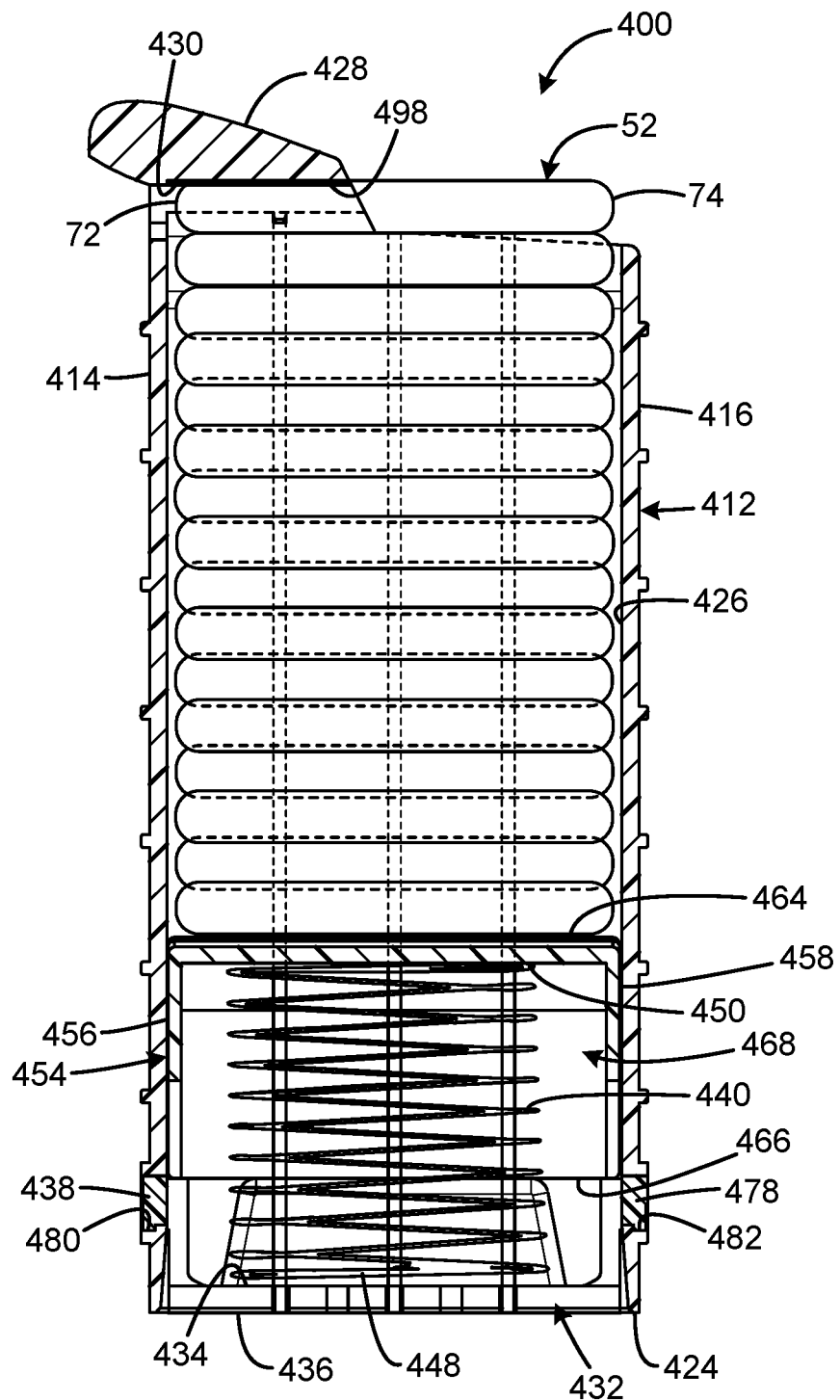
FIG. 13A is a side sectional view of the second alternative embodiment of the magazine for light sticks of FIG. 12 in the ready to dispense a light stick condition.

FIGS. 12-13A illustrate a second alternative embodiment of the improved magazine for light sticks 400 of the present invention. More particularly, the magazine body 412 is generally tubular with a central bore 426, and has a front 414, rear 416, left side 418, right side 420, upper end/top 422, and opposed lower end/bottom 424. The front and rear are opposed major side walls, and the front and rear walls are opposed and elongated. The body is hollow and rectangular, thereby defining an interior passage. The passage has a width adapted to receive a staggered double stack of light sticks. The central bore tapers inwards towards the top to feed a single elongated illumination stick/chemical light stick 52 at a time through the top aperture 476 in communication with the central bore. The top aperture is adapted to enable insertion of light sticks into the interior passage. The top front of the body includes a bridge 428 that defines a front aperture/ejection aperture 430, a rear aperture 498, extends from one major side wall to the other, extends less than half the length of the upper end, is proximate the front wall, and comprises bridge walls extending upward from the major sidewalls and toward each other to meet at a ridge. In the current embodiment, the front aperture is square, the rear aperture is a trapezoid, and both apertures are sized to give the ridge an interior width adapted to closely receive and permit the passage of a single two-inch long light stick 52 having a front 72, a rear 74, and a diameter of 0.236 inch in the current embodiment. The bridge includes a front extension 500 that extends above the front aperture and protrudes forward beyond the front wall. The underside 502 of the front extension is a surface that is arcuate and convex in shape having a radius of 28.19 in the current embodiment. The rear aperture is a first opening adjacent to the bridge/retention element, and the front aperture/ejection aperture is a second opening spaced apart by the first opening. The first opening has a width defined by the spacing between the major sidewalls, a length based on the distance between the front and rear walls less a length of the bridge/retention element, and extends to the rear wall. The second opening is defined in a panel parallel to the front wall and is proximate the front wall. The second opening has a width of 6.40 mm in the current embodiment.

The bottom 424 of the body 412 is open to receive a follower 454 and a rectangular coil spring 440 within the central bore 426. A bottom lid 432 closes the bottom end of the body and secures the follower and spring within the central bore of the body. The bottom lid has a top 434 and a bottom 436. The top includes upwardly protruding latches 438, 478 that releasably secure the bottom lid to the bottom of the body. This is accomplished by the insertion of the latches into apertures 480, 482 in the front 414 and rear 416 of the body. The coil spring biases the follower towards an upper position adjacent to the upper end of the body and is compressed when the magazine body is loaded with light sticks 52. As a result, the follower reciprocates between the upper position and a lower position more proximate the lower end of the body. The bridge 428 serves as a retention element adapted to retain chemical light sticks within the interior passage against the biasing force of the spring.

The follower 454 has a front 456, rear 458, left side (not visible), right side (not visible), top 464, and bottom 466. The top of the follower has a smooth, angled platform portion (not visible) extending the length of the follower. The bottom of the follower defines a channel 468 that bifurcates the underside of the follower and receives the top end 450 of the coil spring 440.

Figure 13B:
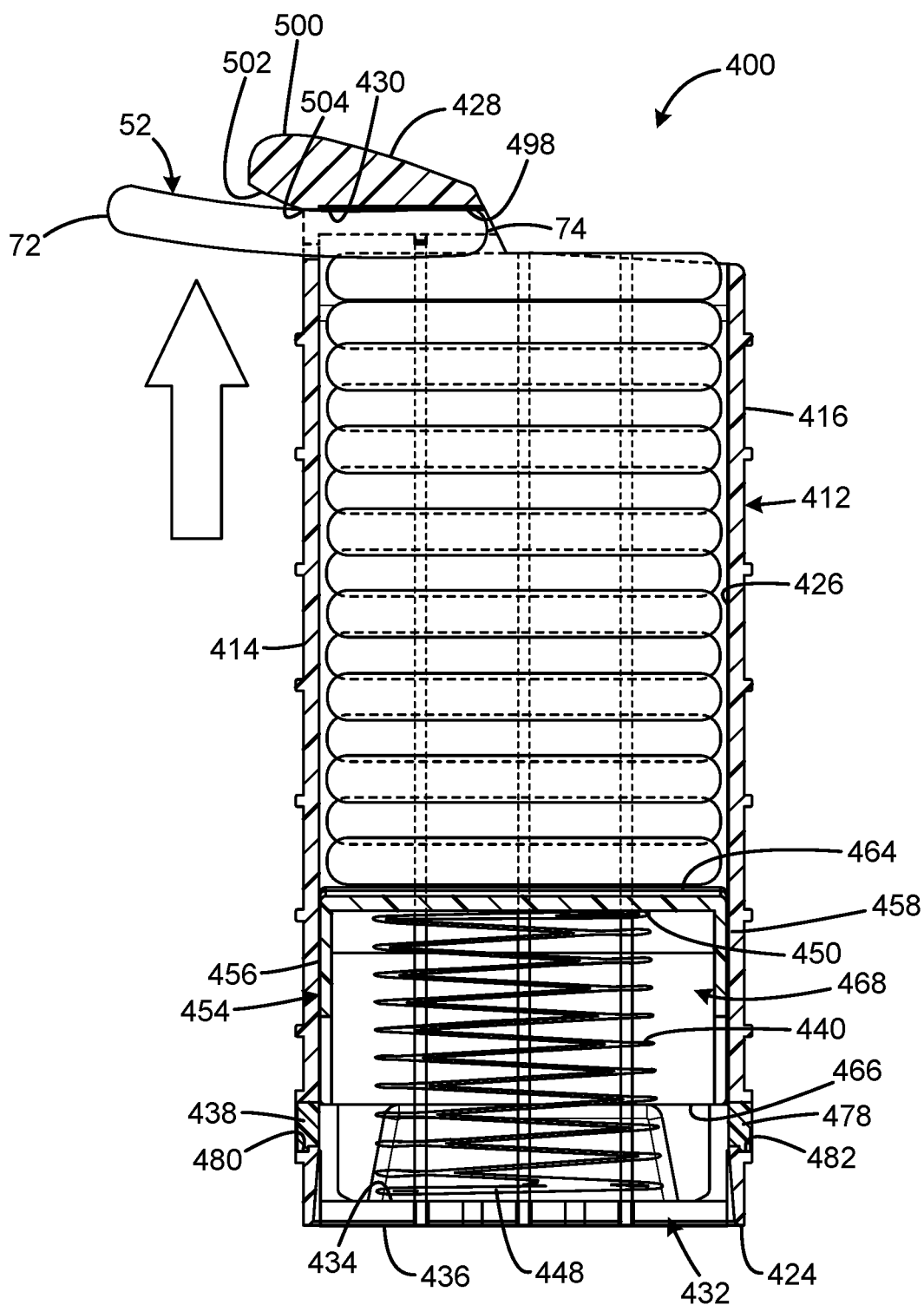
FIG. 13B is a side sectional view of the second alternative embodiment of the magazine for light sticks of FIG. 12 in the process of dispensing a light stick with the light stick partially flexed.
Figure 13C:
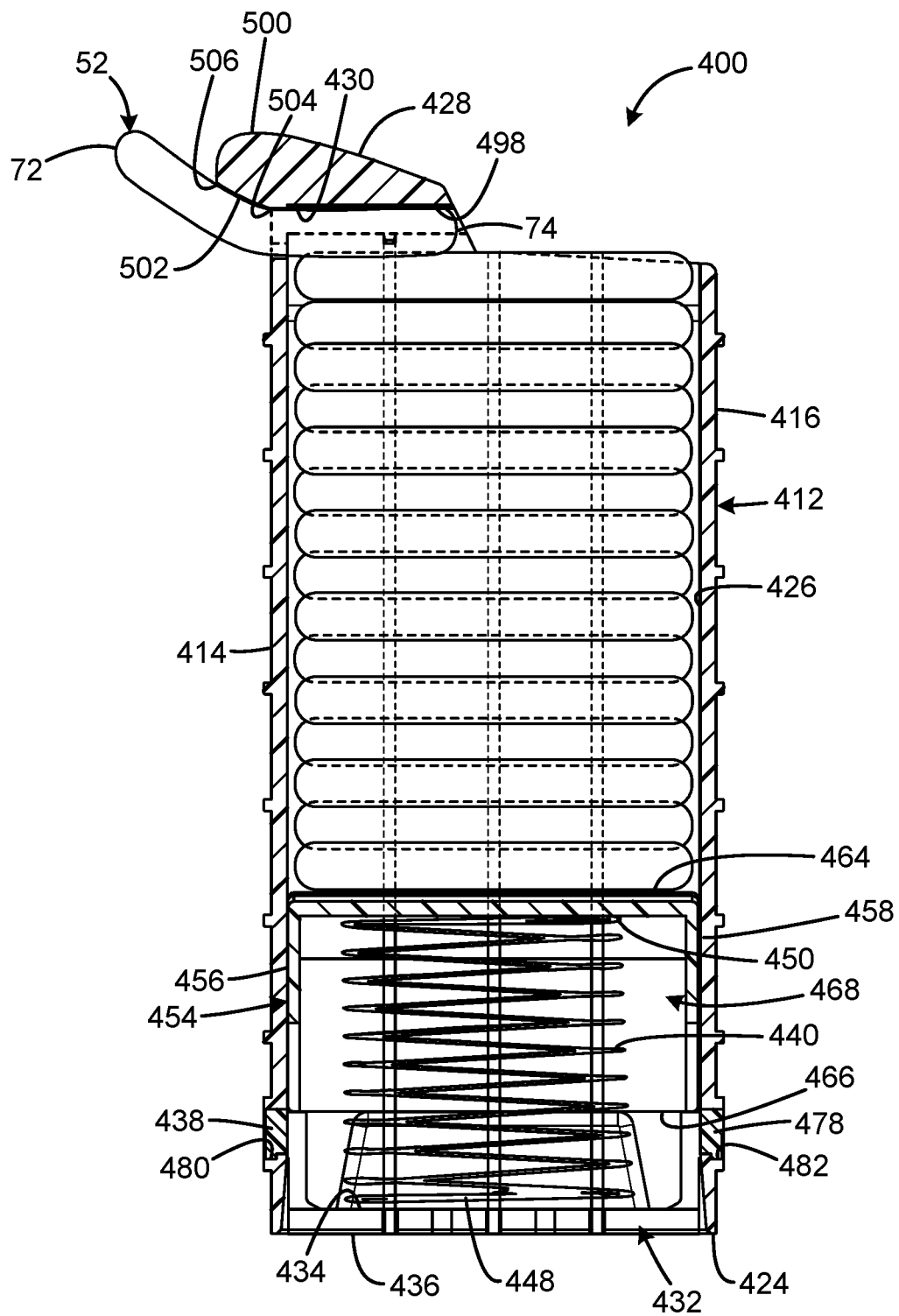
FIG. 13C is a side sectional view of the second alternative embodiment of the magazine for light sticks of FIG. 12 in the process of dispensing a light stick with the light stick fully flexed.

FIGS. 13B-C depict the procedure for dispensing and activating a light stick 52 from the magazine for light sticks 400. Usage of the magazine for light sticks 400 for storing and dispensing light sticks is particularly advantageous because the user can dispense and activate a light stick using only one hand 106. To dispense a light stick, the user first pushes the rear 74 of the uppermost light stick exposed by the top aperture 476 of the body 412 with a thumb 108 to force the front 72 of the light stick that is received under the bridge 428 through the rear aperture 498 and out the front aperture 430. To provide the thumb with leverage, the user grasps the front 414 of the body with a forefinger 114. An intermediate portion of the chemical light stick 42 is closely received by the front aperture/ejection aperture, such that a portion of the light stick protrudes from the body and a portion of the light stick is retained by the body to enable the light stick to be flexed for activation. Once a sufficient portion of the front of the light stick protrudes from the front aperture (about ½"), the user grasps the rear 416 of the body with the thumb, places the forefinger below the front protruding portion of the light stick, and then flexes the light stick upwards until the light stick fractures internally to mix the chemicals stored within and activate the illumination-generating reaction. As is shown in FIG. 13B, the light stick first fractures internally as the intermediate portion of the light stick encounters location 504 of the front extension 500. As the user continues to flex the light stick upwards, the light stick encounters additional portions of the underside 502 of the front extension, including location 506, and fractures internally at one or more additional locations. In the current embodiment, the horizontal distance between the fracture points at 504 and 506 is 7.03 mm, and the vertical distance between the fracture points at 504 and 506 is 3.34 mm. The fracturing of the glass vial (not shown) in multiple locations within the light stick enables the first and second chemicals to mix more rapidly than they could if the glass vial were fractured in only one location. As a result, a vigorous chemical reaction is quickly induced, and the light stick rapidly produces visible light without a delay that could occur if the glass vial were fractured in only one location. Finally, the user pinches the protruding front portion of the light stick between the thumb and forefinger and withdraws the rear of the light stick from under the bridge and under the front extension through the front aperture to dispense the activated light stick. The follower 454 then urges the stack of light sticks upwards until the newly uppermost light stick has its front retained by the bridge, ready to be dispensed by repeating the dispensing and activating procedure.

While current embodiments of a magazine for light sticks have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A light stick-dispensing magazine comprising:
   an elongated tubular body defining a chamber configured to contain a stack of elongated light sticks each having a selected light stick length and opposed ends;
   the body defining an exit aperture communicating with the chamber and proximate to a light stick feeding position;
   a movable actuator proximate the exit aperture and movable between a rest position and an actuated position;
   the body having a retention element proximate the exit aperture;
   the actuator having a pair of spaced apart contact portions spaced apart from the retention element, with the retention element intermediate the contact portions;
   the contact portions being spaced apart by a limited distance less than the light stick length such that the contact portions contact the light stick away from the light stick opposed ends; and
   the retention element and contact portions being operable to flex a light stick occupying the light stick feeding position adequately to fracture an internal element to actuate the light stick in response to movement of the actuator from the rest position to the actuated position.

2. The light stick-dispensing magazine of claim 1 wherein the retention element and contact portion are operable to eject the light stick occupying the light stick feeding position in response to movement of the actuator from the rest position to the actuated position.

3. The light stick-dispensing magazine of claim 1 wherein one of the retention element and the contact portion is configured to contact the light stick occupying the light stick feeding position at an end portion of the light stick, and the other of the retention element and contact portion is configured to contact the light stick occupying the light stick feeding position at an intermediate portion of the light stick.

4. The light stick-dispensing magazine of claim 1 wherein one of the retention element and the contact portion is configured to contact the light stick occupying the light stick feeding position at opposed end portions of the light stick and the other of the retention element and contact portion is configured to contact the light stick occupying the light stick feeding position at an intermediate portion of the light stick.

5. The light stick-dispensing magazine of claim 1 wherein the contact portion includes a plurality of contact points along the length of the light stick and is operable to flex the light stick at each of the contact points.

6. The light stick-dispensing magazine of claim 1 wherein the actuator is movable in a direction perpendicular to a length of the elongated body.

7. The light stick-dispensing magazine of claim 1 wherein the body has opposed parallel major faces and the actuator is movable in a direction perpendicular to the opposed parallel major faces.

8. A light stick-dispensing magazine comprising:
   an elongated tubular body defining a chamber configured to contain a stack of elongated light sticks each having an elongated front side and an opposed elongated back side;
   the body defining an exit aperture communicating with the chamber and proximate to a light stick feeding position;
   a movable actuator proximate the exit aperture and movable between a rest position and an actuated position;
   the body having a retention element proximate the exit aperture and configured to contact a portion of a selected one of the elongated front and back sides of a light stick;
   the actuator having a contact portion spaced apart from the retention element and configured to contact a portion the other of the elongated front and back sides of a light stick; and the retention element and contact portion being operable to flex a light stick occupying the light stick feeding position adequately to fracture an internal element to actuate the light stick in response to movement of the actuator from the rest position to the actuated position.

9. The light stick-dispensing magazine of claim 8 wherein the retention element and contact portion are operable to eject the light stick occupying the light stick feeding position in response to movement of the actuator from the rest position to the actuated position.

10. The light stick-dispensing magazine of claim 8 wherein one of the retention element and the contact portion is configured to contact the light stick occupying the light stick feeding position at an end portion of the light stick, and the other of the retention element and contact portion is configured to contact the light stick occupying the light stick feeding position at an intermediate portion of the light stick.

11. The light stick-dispensing magazine of claim 8 wherein one of the retention element and the contact portion is configured to contact the light stick occupying the light stick feeding position at opposed end portions of the light stick and the other of the retention element and contact portion is configured to contact the light stick occupying the light stick feeding position at an intermediate portion of the light stick.

12. The light stick-dispensing magazine of claim 8 wherein the contact portion includes a plurality of contact points along the length of the light stick and is operable to flex the light stick at each of the contact points.

\* \* \* \* \*